United States Patent
Nagao et al.

(10) Patent No.: US 6,408,024 B1
(45) Date of Patent: Jun. 18, 2002

(54) TELECINE VIDEO SIGNAL DETECTING DEVICE

(75) Inventors: Hiroko Nagao, Tsukuba; Eiichi Toyonaga, Ikoma, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/743,507

(22) PCT Filed: May 10, 2000

(86) PCT No.: PCT/JP00/02969
§ 371 (c)(1),
(2), (4) Date: Jan. 11, 2001

(87) PCT Pub. No.: WO00/70870
PCT Pub. Date: Nov. 23, 2000

(30) Foreign Application Priority Data

May 12, 1999 (JP) ............................................. 11-130912

(51) Int. Cl.[7] .......................... H04N 7/12; H04N 5/253; H04N 3/36; H04N 5/14
(52) U.S. Cl. ..................................... 375/240.01; 348/97
(58) Field of Search ............................. 348/97, 98, 99, 348/699, 700; 375/240.01, 240.16; 396/319; 358/474; H04N 7/12, 5/253, 3/36, 5/14

(56) References Cited

U.S. PATENT DOCUMENTS 5,461,420 A * 10/1995 Yonemitsu et al. .... 375/240.15
5,929,902 A * 7/1999 Kwok .......................... 348/96
5,990,955 A * 11/1999 Koz ...................... 375/240.01

FOREIGN PATENT DOCUMENTS

| JP | 6-233182 | 8/1994 |
| JP | 8-163431 | 6/1996 |
| JP | 8-167033 | 6/1996 |

* cited by examiner

*Primary Examiner*—Nhon T Diep
(74) *Attorney, Agent, or Firm*—Wenderoth, Lind & Ponack, L.L.P.

(57) ABSTRACT

As to a telecine video signal (Sv), in a telecine video signal detector (Dtp) for detecting a scene-change part (SC) and deciding whether successive telecine conversion has been carried out, a motion detector (3) detects a motion between video signals (Sv) one field apart from each other; a first statistical processing unit (4) accumulates detection results (Sm) for one field; a first telecine decision unit (5) decides whether the field represents telecine-converted video; the second statistical processing unit (6) detects statistical information (Ss2) of the input signal (Sv); a scene-change detector (8) detects a scene-change in the output (Ss2) from the second statistical processing unit (6); a second telecine decision unit (9) decides field continuity from a detection result (Ssc) of the scene-change detector (8) and a result (St1) of the first decision unit (5); and then an AND circuit (10) carries out an AND operation on outputs (St1, St2) from the first and second decision units (5, 9).

5 Claims, 17 Drawing Sheets

FIG. 16

| | | Mode_f =0? | FIELD COMPARISON | MOTION DECISION | Counter | Counter >Bth? | IP_Mode | Mode_f | F |
|---|---|---|---|---|---|---|---|---|---|
| | | S202 | (S204) | S204 | S206 S212 | S214 | S208 S216 | S210 S220 | S224 S220 |
| Cc1 | A1 | Yes | | No | 0 | → | IP | 0 | 0 |
| Cc2 | A2 | Yes | | No | 0 | → | IP | 0 | 0 |
| Cc3 | B1 | Yes | A1-B1 | No | 0 | → | IP | 0 | 0 |
| Cc4 | B2 | Yes | A2-B2 | No | 0 | → | IP | 0 | 0 |
| Cc5 | B1 | Yes | B1-B1 | Yes | 1 | No | | 1 | 0 |
| Cc6 | C2 | No | | | | →| | 2 | 0 |
| Cc7 | C1 | No | | | | → | | 3 | 0 |
| Cc8 | D2 | No | | | | → | | 4 | 0 |
| Cc9 | D1 | No | | | | → | | 0 | 0 |
| Cc10 | D2 | Yes | D2-D2 | Yes | 2 | Yes | Film | 1 | 1 |
| Cc11 | E1 | No | | | | → | | 2 | 1 |
| Cc12 | E2 | No | | | | → | | 3 | 1 |
| Cc13 | F1 | No | | | | → | | 4 | 1 |
| Cc14 | F2 | No | | | | → | | 0 | 1 |
| Cc15 | F1 | Yes | F1-F1 | Yes | 3 | Yes | Film | 1 | 1 |
| Cc16 | G2 | No | | | | → | | 2 | 1 |
| Cc17 | G1 | No | | | | → | | 3 | 1 |
| Cc18 | H2 | No | | | | → | | 4 | 1 |
| Cc19 | H1 | No | | | | → | | 0 | 1 |
| Cc20 | J2 | Yes | H2-J2 | No | 0 | → | IP | 0 | 0 |
| Cc21 | K1 | Yes | H1-K1 | No | 0 | → | IP | 0 | 0 |
| Cc22 | L2 | Yes | J2-L2 | No | 0 | → | IP | 0 | 0 |

TELECINE VIDEO SIGNAL DETECTING DEVICE

TECHNICAL FIELD

The present invention relates to telecine video signal detectors in color television receivers and, more specifically, to a telecine video signal detector capable of sequentially detecting even an insuccessive telecine video signal produced due to editing or the like.

BACKGROUND ART

In recent years, various video reproducing methods are available in television, and the need for improving image quality is growing more. When video signals are reproduced through sequential scanning of interlace signals, the importance lies in detection of a telecine video signal produced through conversion from 24-frame film video to an interlace signal with the use of a 2–3 pulldown scheme and recovery of the signals corresponding to the video before telecine conversion, for the purpose of suppressing deterioration in image quality due to interlacing, and improving image quality.

Shown in FIG. 13 is the structure of a conventional telecine video signal detector. A telecine video signal detector Dtc includes a pre-filter 100, a 1-frame delay circuit 120, a motion vector detection circuit 140, a comparison and detection circuit 160, a majority circuit 180, a 5-field delay circuit 200, and a decision circuit 220. The pre-filter 100 eliminates noise in a video signal Sv' provided from an external video signal source (not shown) to the telecine video signal detector Dtc to produce a video signal Sv. The 1-frame delay circuit 120 delays the video signal Sv produced by the pre-filter 100 by one frame (2 fields) to produce a delayed video signal Svd.

The motion vector detection circuit 140 compares the delayed video signal Svd produced by the 1-frame delay circuit 120 and the present video signal Sv each other for detecting a motion of video between fields, and then produces a plurality of motion vectors Sm.

The comparison and detection circuit 160 compares the plurality of motion vectors Sm produced by the motion vector detection circuit 140 with a reference value ($\alpha$, $\beta$). The comparison and detection circuit 160 then outputs, as small-motion vectors Sms, motion vectors that are smaller than the reference value ($\alpha$, $\beta$) among the motion vectors Sm.

The majority circuit 180 takes frequency distribution of the small-motion vectors Sms outputted from the comparison and detection circuit 160, detects the small-motion vectors equal in size, and provides the detection result to the 5-field delay circuit 200 and the decision circuit 220.

The decision circuit 220 counts the number of small-motion vectors Sms equal in value that are not larger than the reference value ($\alpha$, $\beta$), and generates a decision signal SF for deciding that the video signal is a telecine video signal, every time a field in which the number of small-motion vectors is not smaller than a predetermined value $\gamma$ appears for every five fields.

In the above-structured conventional telecine video signal detector Dtc, attention is given to the field in which the number of motion vectors equal in value for one frame (two fields) are not smaller than the predetermined value. When such field appears for every five fields, it is decided that the video signal is a telecine video signal. This decision concept will be further described later with reference to FIG. 14.

With reference to FIGS. 14, 15, and 16, a decision operation in the decision circuit 220 of the telecine video signal detector Dtc is now described in detail. Shown in FIG. 14 are various signals observed in the decision circuit 220.

First, in FIG. 14, Cc1 through Cc22 shown in the top row each represent a control cycle in the telecine video signal detector Dtc. Note that, in the present example, the control cycles Cc1 through Cc22 each correspond to a field period of the video signal Sv. The video signal Sv is provided for every field period in order of field data A1, A2, B1, B2, B1, C2, C1, D2, D1, D2, E1, E2, F1, F2, F1, G2, G1, H2, H1, J2, K1, L2, . . .

Each field data is identified by an identifier generated by adding a numerical suffix to a letter of the alphabet. Each alphabet letter represents an original image from which the data is generated, while each numerical suffix represents a position of the data field in those generated from the same image. In other words, in the above-stated video signal Sv, the alphabet letters A, B, C, D, E, F, G, H, J, K, and L each represent field data of each independent image. As stated above, pieces of field data represented with different suffixes (1 and 2) added to the same alphabet are originally generated from the same film image and, naturally, the difference in motion of the image is extremely small between fields. Furthermore, pieces of field data with the same identifier are the same image. Thus, such pieces of field data represented by identifiers with the same alphabet but different suffixes are hereinafter referred to as same-source field data.

In view of the above, in the video signal Sv, the same-source field data A1 and A2 generated from the same image are placed in the control cycles Cc1 and Cc2, respectively. Then, identical pieces of same-source field data B1 are placed in the following control cycles Cc3 and Cc5. In the control cycle Cc4 therebetween, the field data B2 generated from the same image as that for the filed data B1 is placed.

Similarly, the same-source field data C1 and C2 are placed in the control cycles Cc6 and Cc7; the same-source field data D2 and D1 in the control cycles Cc8 and Cc9, respectively; and the field data D2 that is identical to the field data D2 (generated from the same source as that for the field data D1) in the control cycle Cc10.

The above-described scheme is called a 2–3 pulldown scheme, which is a method of converting film video data differed in frame rate into television video data in such a manner that two pieces of same-source field data and three pieces of another same-source field data (of three, two at both ends are identical field data) are placed every successive five fields. The above-stated successive five fields are hereinafter referred to as a telecine video unit Tu.

In this case, the video signal Sv is a telecine video Vt during the control cycles Cc1 through Cc 19, while a non-telecine video Vnt during the control cycles Cc20 through Cc22. The control cycles Cc1 through Cc5 form a telecine video unit Tu1; the control cycles Cc6 through Cc10 form a telecine video unit Tu2; the control cycles Cc11 through Cc15 form a telecine video unit Tu3; and the control cycles Cc16 through Cc19 form a telecine video unit Tu4. Note that the telecine video unit Tu4 is constructed of not five fields, but four fields. That is, the image field data J2 is placed in the control cycle Cc20, in stead of the field data H2 which is identical to the field data one frame (two fields) before and is supposed to be placed at part (tail end) of the telecine video unit Tu4. In other words, shown in FIG. 14 is one example in which the telecine video Vt is switched into the non-telecine video Vnt in an incomplete state (the telecine video unit Tu of four fields).

The telecine video Vn is produced by converting cinema images of 24 frames/second into interlaced television video of 30 frames (60 fields) through the 2–3 pulldown scheme. The non-telecine video Vnt is interlaced images of 30 frames (60 fields)/second or progressive television video of 60 frames/second. Also in actual broadcasting, a mixture of such telecine video Vt and non-telecine video Vnt is distributed. Therefore, a special process has to be taken especially at the time of switching between the telecine video Vt and the non-telecine video Vnt.

On receiving an input of the above-stated video signal Sv, the decision circuit 220 decides the contents of the video signal Sv to generate internal variables IP_mode and Mode_f. The decision circuit 220 further generates an output flag F specifying the structure of a video signal Si to be outputted based on these internal variables according to the contents of the video signal Sv. Note that the output flag F corresponds to the signal SF.

Specifically, if it is decided that the field of the video signal Sv represents a telecine image, IP_mode=Film is outputted. If otherwise, IP_mode=IP is outputted for indicating a type of video. If it is decided twice in successive two telecine video units Tu that the present field data is identical to the field data two fields before (two control cycles before), it is decided that the video signal Sv represents telecine video, and IP_mode =Film is outputted. Otherwise, IP_mode=IP is outputted. As such, decision as to the telecine video Vt is inevitably delayed by at least two control cycles with respect to changes in the actual contents of the video signal Sv.

Also, once it is decided that the field of the video signal Sv comes to represent a telecine image, five fields including the field at the time of decision and thereafter are assumed to form the telecine video unit Tu. When it is decided that a third field that follows thus-assumed telecine video unit Tu is not identical to a field that comes two fields thereafter, the field is decided to be the non-telecine video Vnt, and IP_mode=IP is outputted. Decision as to the non-telecine video Vnt is inevitably delayed by at least 2 control cycles with respect to changes in the actual contents of the video signal Sv. That is, the value of IP_mode and the contents of the video signal Sv do not completely coincide with each other.

Mode_f indicates, with numerals 0 through 4, a position of each field in a telecine pattern repeated every five fields within the telecine video unit Tu, if the field of the video signal Sv possibly represents a telecine image. The output flag F produces an output with a numeral 0 or 1 based on the values of IP_mode and Mode_f for indicating how to construct the video signal Si. That is, if the output flag F indicates 0, the inputted video signal Sv is assumed to represent the non-telecine video Vnt, and an instruction is given for constructing the video signal Si. If the output flag F indicates 1, the inputted video signal Sv is assumed to represent the telecine video Vt, and an instruction is given for constructing the video signal Si.

The operation of the above-stated telecine video signal detector Dtc is specifically described below by control cycle.
(Cc1 through Cc5: Telecine video unit Tu1)

First, during the control cycles Cc1 through Cc5, the video signal Sv represents telecine video Vt forming the telecine video unit Tu1. Each identical pieces of field data B1 is placed in the control cycles Cc3 and Cc5.

However, the operation of the decision circuit 220 has just began, and the above-described decision condition of the telecine video Vt "when it is decided twice in successive two telecine video units Tu that the present field data is identical to field data two fields before (two control cycles before), the video signal Sv represents telecine video" is not satisfied. Therefore, IP_mode=IP is outputted every control cycle.

As a result, Mode_f=0 and the output flag F=0. In the control cycle Cc1, the video signal Si is not generated. On the other hand, in the control cycle Cc2, an instruction is given for generating the video signal Si for one frame from the field data A1 provided in the control cycle Cc1 and its delayed field data A1 by one field (control cycle). Similarly, the video signal Si in the control cycles Cc3 to Cc5 is composed of the field data A2 (Cc2) and its delayed field data A2', the field data B1 (Cc3) and its delayed field data B1', the field data B2 (Cc4) and its delayed field data B2', and the field data B1 (Cc5) and its delayed field data B1', and is outputted as delayed by one field (control cycle) during the control cycles Cc4, Cc5, and Cc6.
(Cc6 through Cc10: Telecine video unit Tu2)

During the control cycles Cc6 through Cc9, the condition for deciding that the video signal Sv represents the telecine video Vt is not still satisfied. Therefore, over the control cycles Cc6 through Cc9, the video signal Sv represents the telecine video Vt, but, nevertheless, IP_mode=IP is outputted. On the other hand, the field data B1 in the control cycle Cc5 of the telecine video unit Tu1 is identical to the field data two fields before (in one control cycle Cc3). Therefore, the telecine video unit Tu2 possibly represents the telecine video Vt, and Mode_f=1 (Cc6), 2 (Cc7), 3 (Cc8), and 4 (Cc9) are outputted.

Then, the field data D2 in the control cycle CC10 is identical to the field data two fields before (Cc8), and the condition "when it is decided twice in successive two telecine video units Tu that the present field data is identical to field data two fields before, the video signal Sv represents telecine video" is satisfied. Therefore, IP_mode=Film is outputted.

As a result, in the control cycle Cc10, Mode_f=0 and the output flag F=1 are outputted.

Consequently, during the control cycles Cc6 through Cc9, the video signal Si is composed of the field data C2 (Cc6) and its delayed field data C2', the field data C1 (Cc7) and its delayed field data C1', the field data D2 (Cc8) and its delayed field data D2', and the field data D1 (Cc9) and its delayed field data D1', and is outputted in the control cycles Cc7 to Cc10, respectively.

However, in the control cycle Cc10, IP_mode=Film and Mode_f=0. Therefore, the output flag F=1 is outputted. As a result, the video signal Si composed of the same-source field data D2 and D1 is outputted in the control cycle Cc11.
(Cc11 through Cc15: Telecine video unit Tu3)

During the control cycles Cc11 through Cc15, the video signal Sv still represents the telecine video Vt. Therefore, IP_mode=Film is outputted and, as for Mode_f, 1 (Cc11), 2 (Cc12), 3 (Cc13), 4 (Cc14), and 0 (Cc15) are outputted. Consequently, the output flag F=1 is continued to be outputted.

Based on the output flag F=1, as in the preceding telecine video unit Tu2, in the present telecine video unit Tu3, the field data in the present control cycle and the field data in the previous control cycle form a frame (Si) in the next control cycle for output.
(Cc16 through Cc19: Telecine video unit Tu4)

During the control cycles Cc16 through Cc19, the video signal Sv still represents the telecine video Vt. Therefore, IP_mode=Film is outputted and, as for Mode_f, 1 (Cc16), 2 (Cc17), 3 (Cc18), and 4 (Cc19) are outputted. As a result, the output flag F=1 is continued to be outputted. Then, based on the output flag F=1, as in the preceding telecine video unit, the field data in the present control cycle and the field data in the previous control cycle form a frame (Si) in the next cycle for output. Note that, as described above, the telecine video unit Tu4 has not five but four fields as being interrupted at some point.

(Cc20 through Cc22: Non-telecine video unit Vnt)

In the control cycle Cc20 that is originally supposed to a correspond to the fifth field in the preceding telecine video unit Tu4, the field data J2 that has no relation with the field data H2 two fields before is placed. As such, the telecine video unit Tu4 is interrupted.

Thus, during the control cycles Cc20 through Cc22, IP_mode =IP, Mode_f=0, and the output flag F=0 are outputted. As a result, as in the control cycles Cc1 through Cc5, the input field data J2 (Cc20) and its delayed field data J2', the input field data K1 (Cc21) and its delayed field data K1', and the input field data L2 (Cc22) and its delayed field data L2' form the video signal Si.

Next, with reference to a flowchart shown in FIG. 15, the operation of the decision circuit 220 in the case shown in FIG. 14 is described in further detail. When the telecine video signal detector Dtc is energized to start its operation, the decision circuit 220 sets IP_mode, Mode_f, the output flag F, and Counter to each initial value, that is, I_mode=IP, Mode_f=0, the output flag F=0, and Counter=0.

As described in the foregoing, Mode_f is set to 0 (the video signal Sv does not represent telecine video). Therefore, Yes is determined in step S202, and the procedure goes to a next step S204. Note that the telecine video unit counter Counter indicates, in numeral, a position of the telecine video unit that includes the present field in the successive telecine video Vt.

First, in step S202, it is determined whether Mode_f=0. If Yes, that is, if it is determined that the video signal Sv represents the non-telecine video Vnt, the procedure goes to step S204.

In step S204, it is determined whether the number of motion pixels Npm is smaller than a first threshold Ath. If Yes, it is determined that there is no motion between fields, that is, the video signal represents telecine video. The procedure then goes to step S212.

In step S212, the telecine video unit counter Counter is incremented by 1. The procedure then goes to a next step S214.

In step S214, it is determined whether the value of Counter is larger than a second threshold Bth. Note that, in the example shown in FIG. 14, the second threshold Bth is 1. If Yes, that is, if it is determined that the video signal Sv represents the telecine video Vt, the procedure goes to step S216.

In step S216, IP_mode=Film is outputted. The procedure then goes to a next step S218.

On the other hand, in step S214, if No, that is, if it is determined that the video signal Sv represents the non-telecine video Vnt, the procedure skips step S216 to step S218.

Furthermore, in the above-stated step S202, if No, that is, if it is determined that the video signal Sv represents the telecine video Vt, the procedure goes to step S218.

In step S218, only Mode_f is incremented by 1. The procedure then goes to a next step S220.

In step S220, Mode_f is divided by 5 and a remainder is calculated. As a result, even if the value of Mode_f is larger than 5, this value is always adjusted to takes 4 or smaller number. This process is to identify the position of the present video signal Sv in the five-field unit (telecine video unit Tu), as telecine video is formed in a fixed pattern as a unit of five fields. In this case, Mode_f=1 is obtained. Then, the procedure goes to a next step S222.

On the other hand, in the above step S204, if No, that is, if it is determined that the video signal represents the non-telecine video Vnt with a motion in image between fields, the procedure goes to step S206.

In step S206, the telecine video unit counter Counter is set to 0. The procedure then goes to a next step S208.

In step S208, IP_mode=IP is outputted. The procedure then goes to a next step S210.

In step S210, Mode_f=0 is outputted. The procedure then goes to step S222.

In step S222, after the process in step S220 or step S210, it is determined whether IP_mode=Film. If after the process in step S220, IP_mode=Film has been set in step S216, and Yes is naturally determined. Then, the procedure goes to step S226. On the other hand, if after the process in step S210, IP_mode=IP has been set in step S208, and No is naturally determined. Then, the procedure goes to step S224.

In step S224, the value of the output flag F is set to 0. Then, an instruction is made for the video signal Si corresponding in frame structure to the non-telecine video. Then, the procedure returns to step S202 to repeat the above processing.

On the other hand, in step S226, the value of the output flag F is set to 1. Then, an instruction is made for the video signal Si corresponding in frame structure to the telecine video. Then, the procedure returns to step S202 to repeat the above processing.

Next, with reference to FIG. 16, the operation of the decision circuit 220 shown in FIG. 13 for each control cycle is described in detail based on the flow chart shown in FIG. 15. Note that shown in FIG. 16 are values of the parameters in each step in the flow chart of FIG. 15.

As described above, when the decision circuit 220 starts to operate, the parameters in the decision circuit 220 are set to initial values (IP_mode=IP, Mode_f=0, the output flag F =0, and the telecine video unit counter Counter=0).

Therefore, in the control cycle Cc1, the field data A1 of the telecine video Vt is provided for process. However, since the operation has just begun, Yes in step S202, No in step S204 (due to no field data for motion comparison), Counter=0 in step S206, IP_mode=IP in step S208, Mode_f=0 in step S210, No in step S222, and then F=0 in step S224.

During the control cycles Cc2 through Cc4, the field data A2 (Cc2), B1 (Cc3), and B2 (Cc4) of the telecine video Vt are provided, and the same processing as that in the above-described control cycle Cc1 is carried out. However, fields data to be compared in step S204 are the field data A1 and the data B1 (Cc3), and the field data A2 and B2 (Cc4).

In the control cycle Cc5, the field data B1 of the telecine video Vt is provided for process. Consequently, Yes in step S202, Yes in step S204 (the field data B1 and B1 are for motion comparison), Counter=1 in step S212, No in step S214, Mode_f =1 in steps S218 and S220, No in step S222, and then F=0 in S224.

In the control cycle Cc6, the field data C2 of the telecine video Vt is then provided for process. Consequently, No in step S202, Mode_f=2 in step S220, No in step S222, and then F=0 in S224.

During the control cycles Cc7 through Cc9, the field data C1, D2, and D1 are then provided for process. Consequently, as in the control cycle Cc6, the procedure goes to steps S202, S218, S220, S222, and then S224. As the control cycle advances, the value of Mode_f changes as 3, 4, 0, respectively. Note that the value of the output flag F in step S224 is 0.

In the control cycle Cc10, the field data D2 identical to the field data two fields before (Cc8) is provided. Consequently, as in the control cycle Cc5, the same field data is detected, and the condition "when it is decided twice in successive two telecine video units Tu that the present field data is identical to field data two fields before (two control cycles before), the video signal Sv represents telecine video" is satisfied. Therefore, Yes in step S202, Yes in step S204, Counter=2 in step S212, Yes in step S214, and IP_mode= Film is set in step S216. Then, Mode_f =1 after steps S218 and S220, Yes in step S222, and the output flag F=1 is set in step S226.

Thereafter, during the control cycles Cc11 through Cc19, No in step S202, Yes in step S222 after steps S218 and S220, and then the output flag F=1 is outputted in S226. Note that, during these cycles, instep S220, 2 (Cc11, Cc16), 3 (Cc12, Cc17), 4 (Cc13, Cc18), 0 (Cc14, Cc19) are outputted, respectively, as the value of Mode_f. Also, in the control cycle Cc15, the value of the telecine video unit counter Counter is incremented to 3 in step S212.

The processing during the control cycles Cc20 through Cc22 is similar to that in the above-described control cycle Cc3.

As such, the video signal Si correctly structured in frame can be generated from the video signal Sv which is a mixture of the non-telecine video Vnt and the telecine video Vt.

With the above structure, however, for a field the motion vectors of the same value for one frame is not larger than a predetermined value, whether the signal is a telecine video signal or not cannot be decided. Therefore, especially if part of the telecine signal is missing due to editing or the like, the part cannot be detected. Thus, the signal may be erroneously detected as a telecine signal for four fields at maximum that are assumed to correspond to the telecine video unit Tu.

With reference to FIG. 17, the above-mentioned problem is specifically described. In FIG. 17, as in FIG. 14, Cc61 through Cc71 each represent a control cycle in the telecine video signal detector Dtc. The video signal Sv is provided in order of field data E2, F1, F2, F1, G2, G1, H2, I1, J2, K1, and L2 for each field period. In this case, the video signal Sv represents the telecine video Vt during the control cycles Cc61 through Cc67, while indicating the non-telecine video VnT during the control cycles Cc68 through Cc71.

Note that, during the control cycles Cc61 through Cc71 except for the control cycle Cc68, the field data identical to those during the control cycles Cc12 through Cc22 in FIG. 14 are provided. In the control cycle Cc68, however, as a result of editing, not the same-source field data H2 as the previous field data H1 but the field data I1 of a different image is provided. Although not shown, in the control cycle previous to the control cycle Cc61, the telecine video Vt is provided.

That is, the control cycles Cc60 through Cc64 form a complete telecine video unit Tux (x is an arbitrary integer). During the preceding control cycles through the control cycle Cc64, the above-mentioned condition "when it is decided twice in successive two telecine video units Tu that the present field data is identical to field data two fields before (two control cycles before), the video signal Sv represents telecine video" is satisfied. Therefore, it is assumed in the control cycle Cc65 that a telecine video unit Tux+1 following the telecine video unit Tux starts. Then, in the successive control cycles Cc65, Cc66, Cc67, and Cc68, as in the control cycles Cc16 through Cc18, IP_mode=Film, 1, 2, 3, and 4, respectively, as Mode_f, and the output flag F=1 are outputted.

Therefore, in the control cycle Cc68, the output flag F=1. Therefore, the video signal Si originally supposed to be formed of the same-source field data H1 and H2 but actually formed of the telecine field H2 and the different image field data II is outputted in the control cycle Cc69. As a result, the frame image formed of different image field is incomplete and looks bad. Note that, in the control cycle Cc68, the video signal Si is changed in representation to the non-telecine video Vnt. Therefore, the video signal Si is originally supposed to be formed of the field data II and its delayed field data I1'.

In the control cycles Cc69 through Cc71, as in the above-described control cycles Cc20 through Cc22, IP_mode=IP, Mode_f=0, and the output flag F=0 are outputted, and the video signal is correctly formed. As described above, in the conventional telecine video signal detector Dtc, for the telecine video signal Sv produced through 2–3 pulldown conversion, whether the present field data represents a telecine video signal is determined depending on whether the third and fifth of successive five pieces of field data are identical.

Thus, basically, if the telecine video signal Sv is provided with its state being changed to the non-telecine video Vnt while the telecine video unit Tu is incomplete, that is, successive five fields are not yet satisfied, whether the present field data represents the telecine video Vt or non-telecine video Vnt cannot be determined correctly.

Thus, as shown in FIG. 14, if the fifth field of the telecine video unit Tu is missing, the third and fourth field data are the same-source field data in the 2–3 pulldown scheme. For this reason, the present frame generation in telecine video does not cause a problem of image distortion.

As shown in FIG. 17, however, if the fourth or later field data of the telecine video unit Tu is missing, different image field data is placed after the third of the telecine video unit Tu (that is, at the fourth position). Therefore, the video signal Si representing distorted image formed in frame of different image fields is erroneously outputted.

In view of the above problem, an object of the present invention is to provide a telecine video signal detector capable of sequentially detecting even an insuccessive telecine video signal produced due to editing or the like.

DISCLOSURE OF THE INVENTION

To achieve the above objects, the present invention has the following aspects.

A first aspect of the present invention is directed to, in a telecine video signal obtained through conversion into an interlaced signal by a 2–3 pulldown scheme, a telecine video signal detector for detecting, if part of the telecine signal is missing due to editing or the like, the missing part of the telecine signal and deciding whether successive telecine conversion has been carried out, the detector comprising:

a motion detector for detecting a motion of an image between a first field of the telecine video signal and a second field at least one or more fields apart from the first field, and generating a motion detection signal;

a first statistical processing unit for accumulating the motion detection signals for one field, and generating a first statistical signal;

a first telecine decision unit for deciding, based on the first statistical signal, whether the first field represents a telecine-converted image, and generating a first telecine decision signal;

a second statistical processing unit for carrying out a histogram operation with respect to the telecine video signal for one field, and generating a second telecine decision signal including video statistical information;

a 1-field delay unit for delaying the second statistical signal by at least one field, and generating a delayed second statistical signal;

a scene-change detection unit for detecting, based on the second statistical signal, the delayed second statistical signal, and a predetermined threshold, a scene-change in the telecine video, and generating a scene-change detection signal;

a second decision unit for deciding, based on the scene-change detection signal and the first telecine decision signal, whether the first field represents an image produced through successive telecine conversion, and generating a second telecine decision signal; and an AND operation unit for carrying out an AND operation on the first telecine decision signal and the second telecine decision signal, wherein whether the first field represents the image produced through successive telecine conversion is indicated based on a result of the AND operation.

As described above, in the first, by ANDing the values of the two telecine decision units, it can be successively decided that the signal represents an image produced through telecine conversion. Consequently, if part of the telecine signal is missing due to editing or the like, the part can be detected, and whether successive telecine conversion has been carried out can be decided.

According to a second aspect, in the first aspect, the predetermined threshold is two or more, and the scene-change detection unit adaptively detects the scene-change.

According to a third aspect, in the first aspect, wherein the second statistical processing unit outputs a plurality of second statistical signals, the scene-change detection unit comprises:
  a plurality of scene-change detection circuits for generating a plurality of scene-change detection signals corresponding to the plurality of second statistical signals; and
  an OR operation unit provided with the plurality of scene-change detection signals for carrying out an OR operation, and
the scene-change of the video signal is detected with a result of the OR operation on the plurality of scene-change detection signals.

According to a fourth aspect, in the first aspect, the first decision unit comprises a 5-field delay unit for delaying the first statistical signal by five fields, and generates a timing signal, and
  the detector comprises a selection unit for selectively outputting one of the first telecine decision signal and the second telecine decision signal based on the timing signal, and successively decides whether the video signal represents video produced through telecine conversion.

According to a fifth aspect, in the fourth aspect, the detector further comprises a 2-field delay unit for further delaying the delayed second statistical signal by two fields and generating a delayed third statistical signal;
  a first switch unit for selectively inputting, based on the first telecine decision signal, one of the motion detection signal and the video signal to the first statistical processing unit by a unit of field; and
  a second switch unit for outputting a result of accumulation of the motion detection signals for one field and a result of a statistical process on the input signal for one field that are carried out only by the first statistical processing unit with a help of the first switch unit switching an input to the first statistical processing unit, and switching, based on an output from a sequence detector, a destination to which the first statistical signal is provided between the first telecine decision unit and the scene-change detection unit.

BRIEF DESCRIPTION OF THE DRAWINGS

FIG. 16 is a diagram showing changes in parameter in the decision circuit of the telecine video signal detector shown in FIG. 13.

BEST MODE FOR CARRYING OUT THE INVENTION

Figure 1:
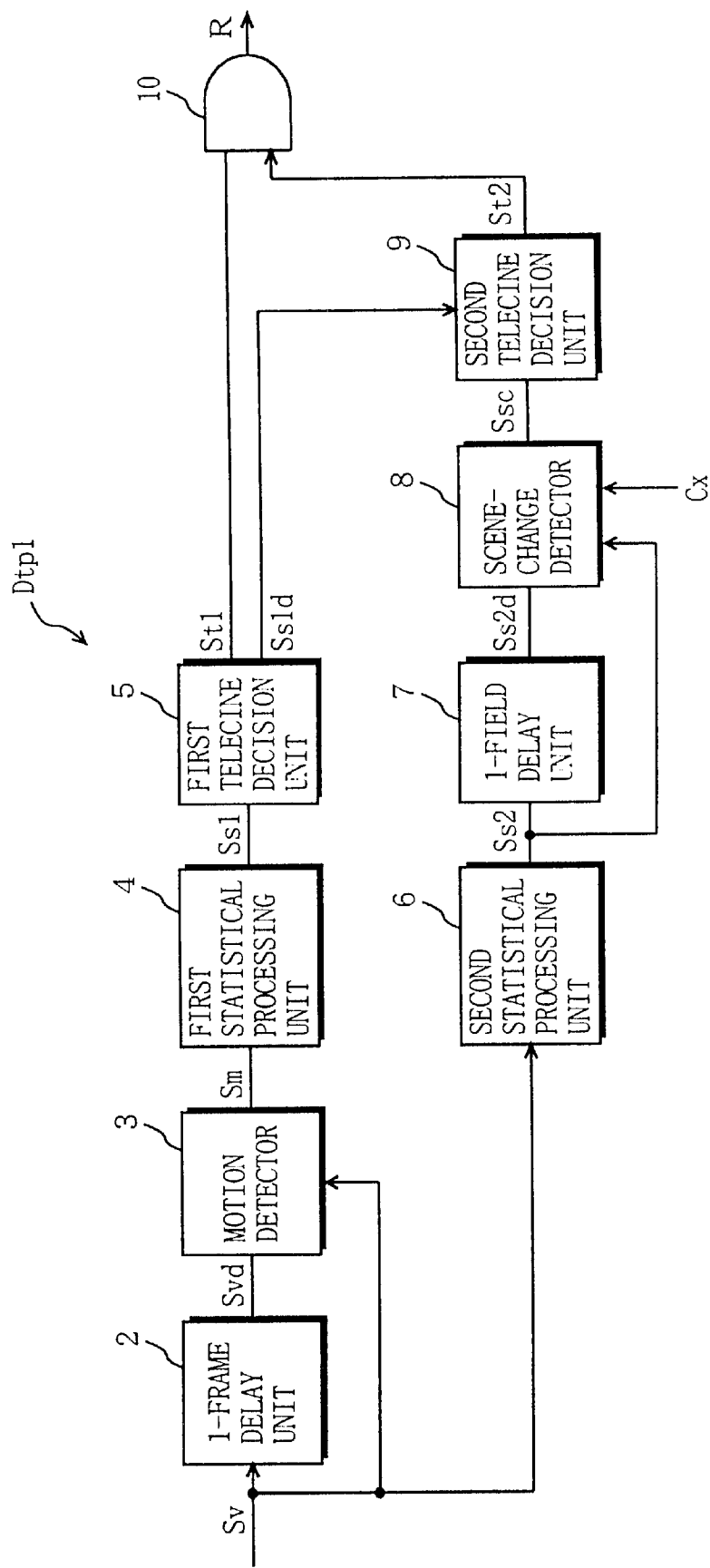
FIG. 1 is a block diagram showing the structure of a telecine video signal detector according to a first embodiment of the present invention.

The present invention is described in more detail in accordance with the attached drawings.
(First Embodiment)
With reference to FIGS. 1, 2, 3, 4, 5, 6, and 7, a telecine video signal detector according to a first embodiment of the present invention is described below. As shown in FIG. 1, a telecine video signal detector Dtp1 includes a 1-frame delay unit 2, a motion detector 3, a first statistical processing unit 4, a first telecine decision unit 5, a second statistical processing unit 6, a 1-field delay unit 7, a scene-change detector 8, a second telecine decision unit 9, and an AND circuit 10.

The 1-frame delay unit 2 delays an inputted video signal Sv by one frame for generating a delayed video signal Svd.

The motion detector 3 detects, based on the delayed video signal Svd outputted from the 1-frame delay unit 2 and the video signal Sv, whether there is a motion therebetween, and generates a motion detection signal Sm.

The first statistical processing unit 4 accumulates the motion detection signals Sm outputted from the motion detector 3 for one field, and generates a first statistical signal Ss1.

The first telecine decision unit 5 decides, based on the first statistical signal Ss1 outputted from the first statistical processing unit 4, whether a particular field of the video signal Sv represents an image produced through telecine conversion to generate a first telecine decision signal ST1, and also generates a timing signal Ss1d for the second telecine decision unit 9.

The second statistical processing unit 6 accumulates the video signals Sv for one field for carrying out a histogram operation to generate a second statistical signal Ss2.

The 1-field delay unit 7 delays the second statistical signal Ss2 outputted from the second statistical processing unit 6 by one field to generate a delayed second statistical signal Ss2d.

The scene-change detector 8 generates, based on the second statistical signal Ss2 outputted from the second statistical processing unit 6 and the delayed second statistical signal Ss2d outputted from the 1-field delay unit 7, a scene-change detection signal Ssc by using a predetermined threshold Cx when the video signals Sv makes a scene-change. Herein, a scene-change means that successive two pieces of field data are from the same source if the video signal Sv is telecine video Vt. Also, this means that the field data is switched from the telecine video Vt to non-telecine video Vnt.

The second telecine decision unit 9 decides, based on the scene-change detection signal Ssc outputted from the scene-change detector 8 and the timing signal Ss1d outputted from the first telecine decision unit 5, whether the field of the video signal Sv represents an image produced through telecine conversion to generate a second telecine decision signal St2.

The AND circuit 10 carries out an AND operation on the first telecine decision signal St1 outputted from the first telecine decision unit 5 and the second telecine decision signal St2 outputted from the second telecine decision unit 9 to output an operation result R.

Figure 2:
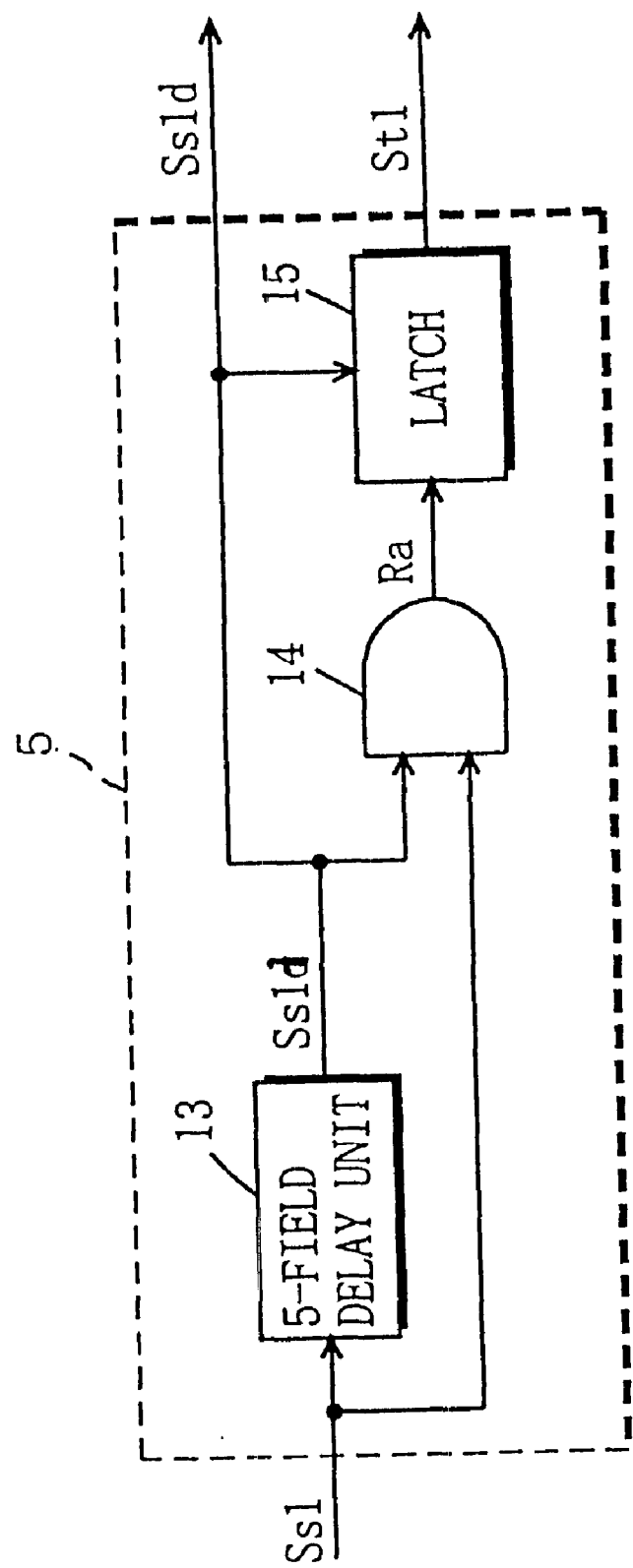
FIG. 2 is a block diagram showing the structure of a first telecine decision unit of FIG. 1.
Figure 13:
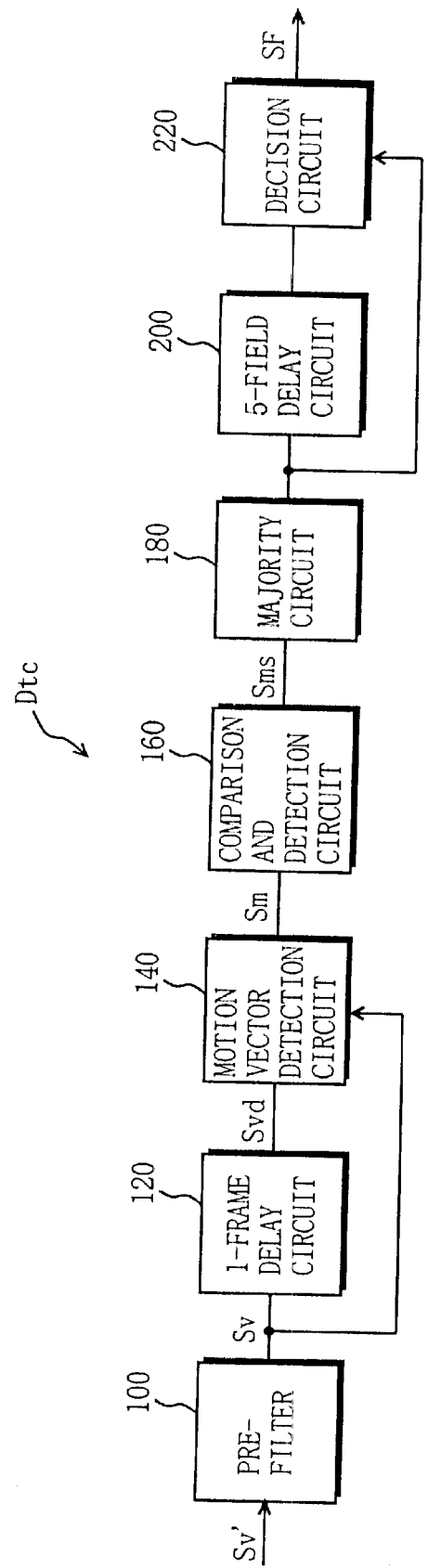
FIG. 13 is a block diagram showing the structure of a conventional telecine video signal detector.
Figure 14:
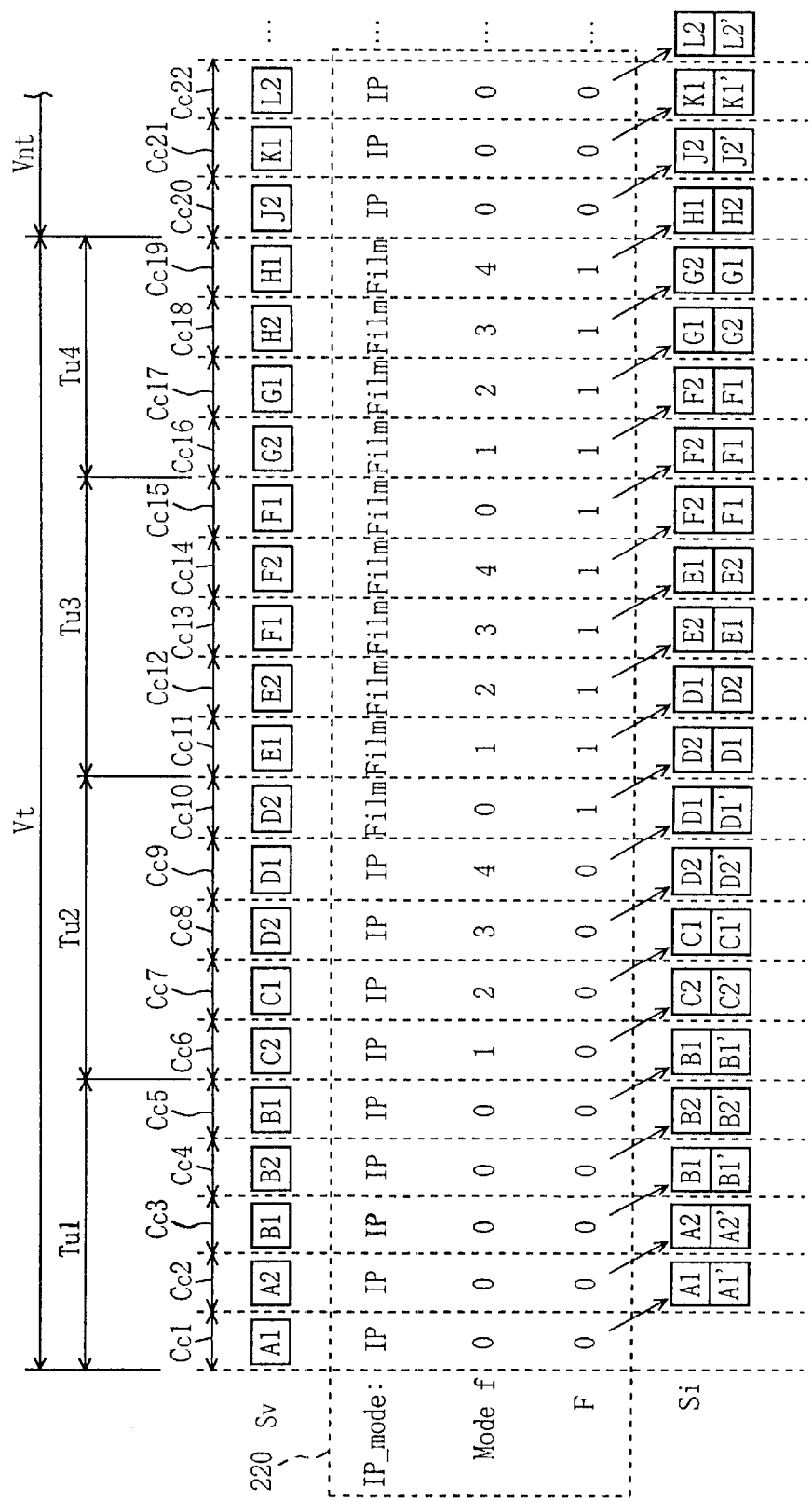
FIG. 14 is a diagram in assistance of explaining the operation of a decision circuit of the telecine video signal detector shown in FIG. 13.

Next, with reference to FIG. 2, the structure of the first telecine decision unit 5 is described. Note that the first telecine decision unit 5 performs an operation similar to that performed by the 5-field delay circuit 200 and the decision circuit 220 in the telecine video signal detector Dtc shown in FIG. 13. That is, by using the fact that, in the telecine video signal, the same signal as that of a 1-frame delayed signal is transmitted every five fields, whether the video signal Sv is a telecine signal is decided. The first telecine decision unit 5 includes a 5-field delay unit 13, an AND circuit 14, and a latch 15. The 5-field delay unit 13 delays the first statistical signal Ss1 provided to the first telecine decision unit 5 by five field to generate the above-stated timing signal Ss1d. The timing signal Ss1d is outputted to the second telecine decision unit 9 as a timing output signal of the first telecine decision unit 5.

The AND circuit 14 carries out the AND operation on the timing signal Ss1d outputted from the 5-field delay unit 13 and the first statistical signal Ss1 to output an operation result Ra. The latch 15 loads the operation result Ra if a value of the timing signal Ss1d outputted from the 5-field delay unit 13 indicates 1, and holds the operation result Ra if the timing signal Ss1d indicates 0.

Figure 3:
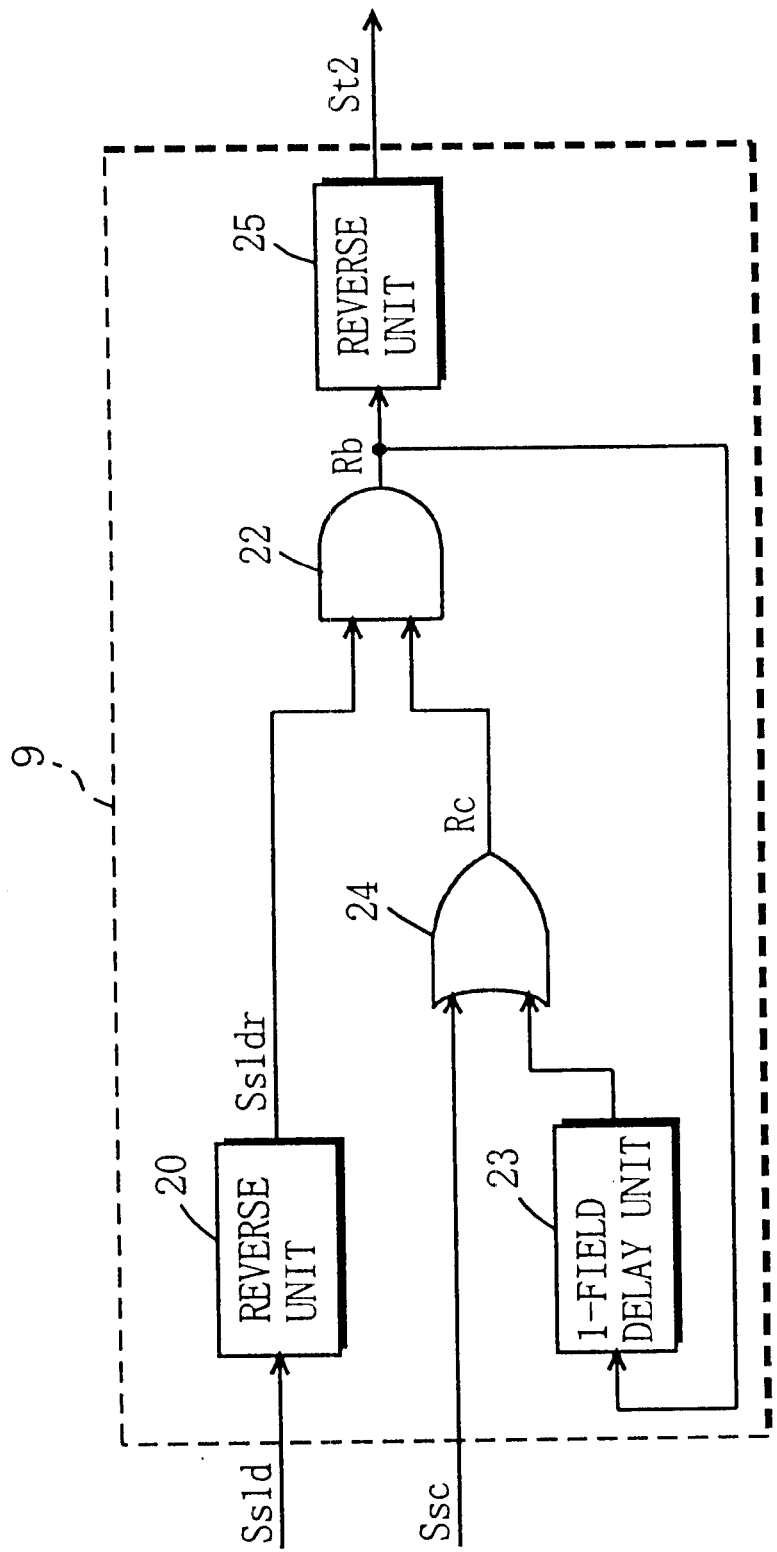
FIG. 3 is a block diagram showing the structure of a second telecine decision unit of FIG. 1.

Next, with reference to FIG. 3, the structure of the second telecine decision unit 9 is described. Note that the second telecine decision unit 9 generates a signal for immediately generating a video signal Si corresponding to non-telecine video even if 2–3 pulldown rules in the video signal Sv are abruptly broken due to editing or the like, which is a main characteristic of the present invention, as will be described later. The second telecine decision unit 9 includes a reverse unit 20, an AND circuit 22, a 1-field delay unit 23, an OR circuit 24, and a reverse unit 25.

The reverse unit 20 reverses the timing signal Ss1d outputted from the first telecine decision unit 5 to generate a reversed timing signal Ss1dr.

The AND circuit 22 carries out the AND operation on the reversed timing signal Ss1dr outputted from the reverse unit 20 and an output signal Rc from the OR circuit 24 to produce an operation result Rb.

The OR circuit 24 carries out an OR operation on the scene-change detection signal Ssc outputted from the scene-change detector 8 and the operation result Rb representing a state of scene-change in one previous field outputted from the 1-field delay unit 23 to output an operation result Rc to the AND circuit 22.

The reverse unit 25 reverses the operation result Rb outputted from the AND circuit 22 to produce the above-stated second telecine decision signal St2.

Figure 4:
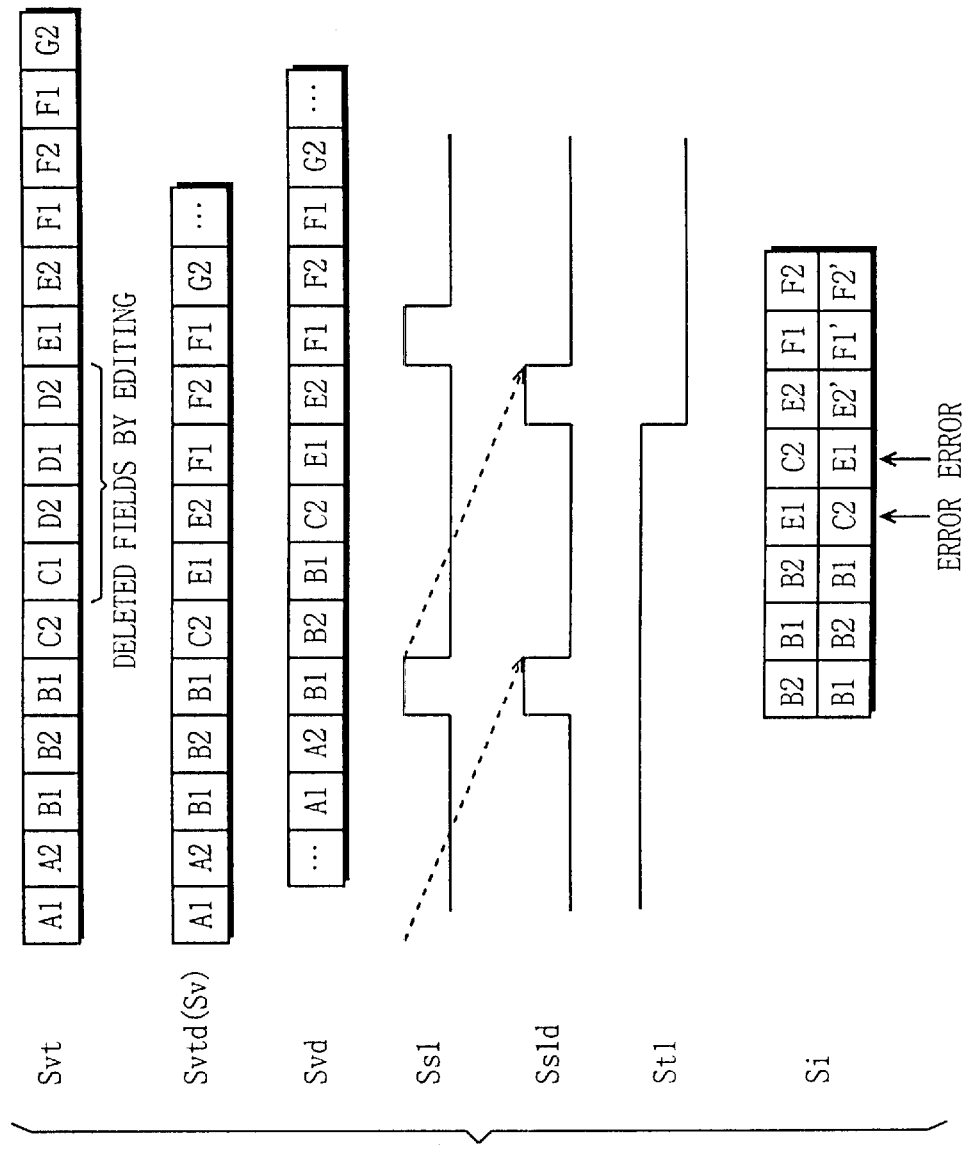
FIG. 4 is a diagram in assistance of explaining the operation of the first telecine decision unit shown in FIG. 1.
Figure 5:
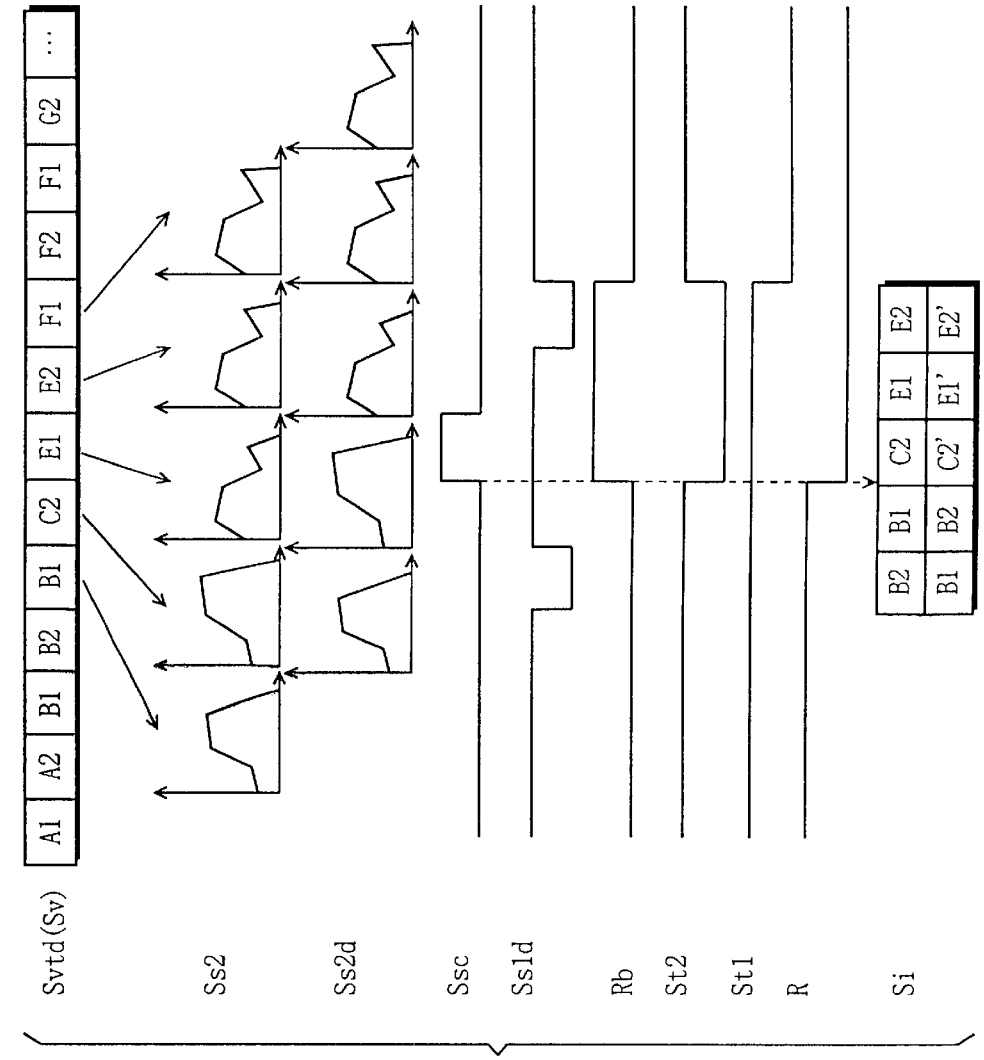
FIG. 5 is a diagram in assistance of explaining the operation of the telecine video signal detector shown in FIG. 1.

Next, with reference to FIGS. 4 and 5, the operation of the above-stated telecine video signal detector Dtp1 is described.

In FIG. 4, A1 and A2 each represent a telecine video signal obtained by converting film video A into an interlaced signal through 2–3 pulldown, while B1, B2, and B1 each represent a telecine video signal obtained by converting film video B into an interlaced signal through 2–3 pulldown. The same goes for C, D, E, F, and G, each representing a telecine video signal obtained by conversion into an interlaced signal through 2–3 pulldown.

In FIG. 4, a telecine video signal Svt is successively shown in the first row from top. Shown in the second row is a part-missing telecine signal Svtd transmitted to a receiver while C1, D2, D1, and D2 are missing due to editing. Note that this part-missing telecine signal Svtd is provided to the telecine video signal detector Dtp1 as the video signal Sv.

Shown in the third row is the delayed video signal Svd outputted from the 1-frame delay unit 2. Shown in the fourth row is the first statistical signal Ss1 outputted from the first statistical processing unit 4. Note that the motion detector 3 and the first statistical processing unit 4 decides, based on the delayed video signal Svd and the video signal Sv (the part-missing telecine video signal Svtd), whether there is a motion in the image for each field. The first statistical signal Ss1 indicates an output of 0 if there is a motion in video for one frame, and 1 if the video is the same.

Shown in the fifth row is the timing signal Ss1d outputted from the 5-field delay unit 13 of the first telecine decision unit 5. From the telecine signal and the 1-frame delayed signal (delayed video signal Svd), exactly the same signal (the same field data) can be produced for every five fields. Therefore, if the rules of the telecine signal are being observed, the first statistical signal Ss1 and the timing signal Ss1d are supposed to be identical. However, as shown in the first row of FIG. 4, the deleted fields (C1, D2, D1, D2)

prevent the first statistical signal Ss1 and the timing signal Ss1d from being the same in timing. Based on the difference in timing, it is decided that the video signal Sv is not a telecine signal.

Shown in the sixth row is the first telecine decision signal St1 outputted from the first telecine decision unit 5. That is, the first telecine decision unit 5 ANDs the first statistical signal Ss1 and the timing signal Ss1d generated by delaying the first statistical signal Ss1 by five fields, latches the AND result (Ra) in timing of the timing signal Ss1d, and then outputs the latch result as the first telecine decision signal St1.

Shown in FIG. 4 is, however, the operation identical to that of the conventional telecine video signal detector Dtc. Therefore, if the video signal Si is outputted based on this first telecine decision signal St1, as shown in the seventh row, two error screens (a frame composed of the fields E1 and C2 and a frame composed of the field data C2 and E1) are outputted, and then finally the telecine process ends. This is because determination about the telecine signal is made every five fields, which is the problem in the conventional telecine video signal detector Dtc. In the present embodiment, another decision unit is provided as shown below to prevent output of such error screens.

Next, shown in FIG. 5 are, in comparison, the video signal Sv (part-missing telecine video signal Svtd), the second statistical signal Ss2, the delayed second statistical signal Ss2d, the scene-change detection signal Ssc, the reverse timing signal Ss1dr, the operation result Rb, the second telecine decision signal St2, the first telecine decision signal St1, the operation result R, and the video signal Si.

The second statistical processing unit 6 is provided with the video signal Sv (the part-missing telecine video signal Svtd) to carry out an operation on frequency of occurrence of each luminance level for one field, and outputs a histogram (the second statistical signal Ss2). The 1-field delay unit 7 delays the second statistical signal Ss2 by one field to output the delayed second statistical signal Ss2d.

The scene-change detector 8 outputs 1 if the output result of the histogram for one field (the difference (the second statistical signal Ss2)—the delayed second statistical signal Ss2d) is larger than a predetermined threshold Cx, and 0 if otherwise, as the scene-change detection signal Ssc.

The second telecine decision unit 9 resets the scene-change detection signal Ssc outputted from the scene-change detector 8 to 0 if the reversed timing signal Ss1dr outputted from the reverse circuit 20 indicates 0, and keeps data of 1 until next reset if the scene-change detection signal Ssc becomes 1 during a period when the reversed timing signal Ss1dr indicates 1 (the operation result Rb). The reverse unit 25 reverses the operation result Rb to generate the second telecine decision signal St2.

For the second telecine decision signal St2, in a signal of five fields in the 2–3 pulldown scheme (telecine video unit Tu), a high correlation is observed between the second and fourth signals and the respective immediately-preceding signals (that is, the first and third) (that is, they are the same-source field data). With the use of this, the second telecine decision signal indicates whether the correlation disappears between the first and second field data or the third and fourth field data. In other words, in the present invention, in addition to detection for every five fields carried out by the conventional telecine video signal detector Dtc, detection is made in the second and fourth in the five fields to prevent occurrence of errors.

The result of the AND operation on the second telecine decision signal St2 and the first telecine decision signal St1 in the AND circuit is the operation result R. This result is outputted as a decision signal of telecine conversion (this signal corresponds to the output flag F). Thus, if part of the telecine video signal Svt is missing (the video signal Sv), the part can be detected, and whether successive telecine conversion has been made can be decided.

Shown in the tenth row of FIG. 5 is a frame structure of the video signal Si based on the operation result R. The presence or absence of the telecine signal is decided at the second and fourth in the telecine video unit Tu of the video signal Sv subjected to the 3–2 pulldown process. Therefore, whether the telecine rules are broken can be detected at the time of decision. In the drawing, the scene-change detection signal Ssc leads at a trailing edge of the second telecine decision signal St2, and thus a scene-change of the video signal Si from the telecine video Vt to the non-telecine video Vnt has been detected. As a result, even in the non-telecine video Vnt immediately after the telecine video Vt, the video signal Si is composed of the field data C2 and its delayed field data C2'. Thus, occurrence of error screens is prevented.

Figure 6:
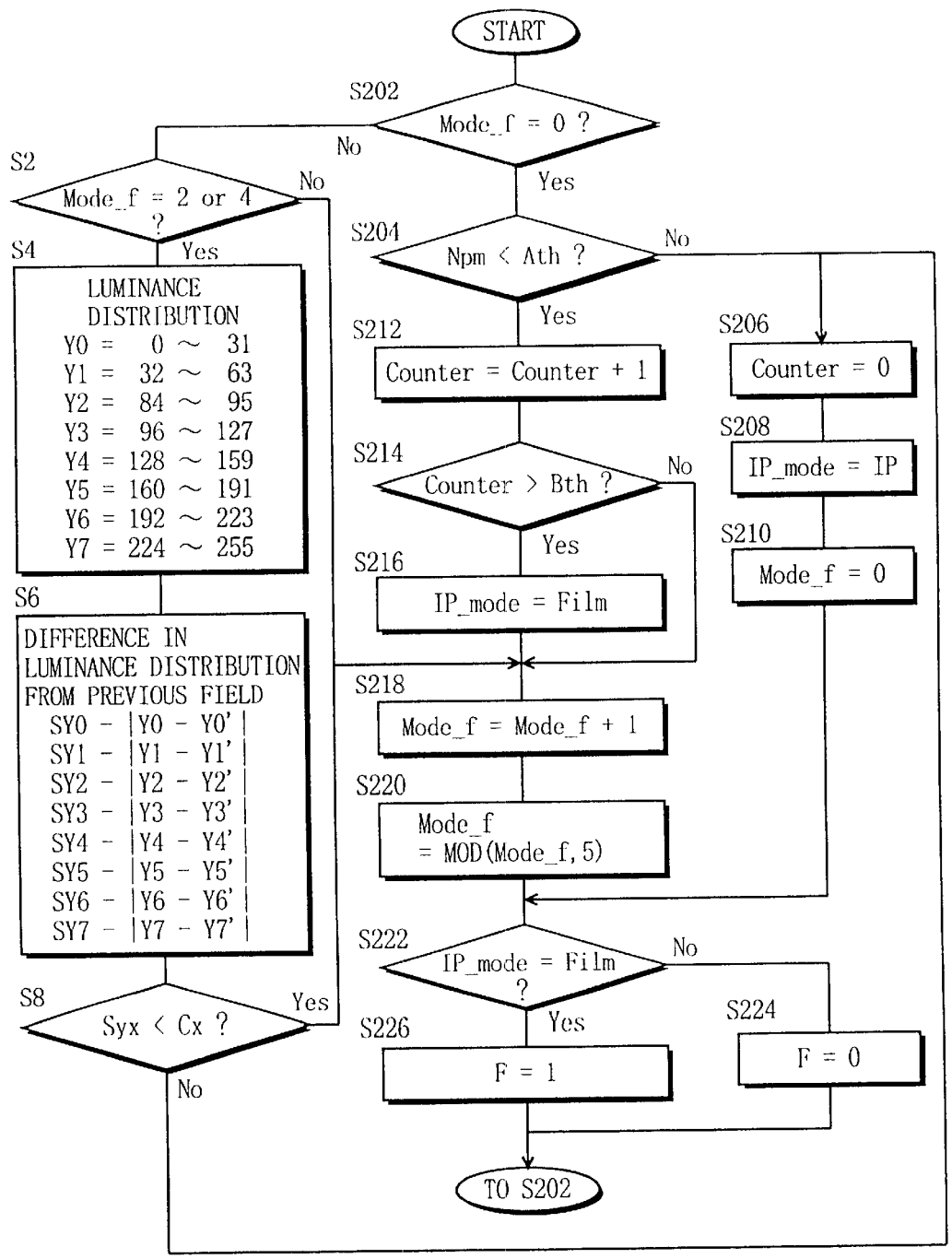
FIG. 6 is a flow chart showing the operation of the telecine video signal detector shown in FIG. 1.
Figure 15:
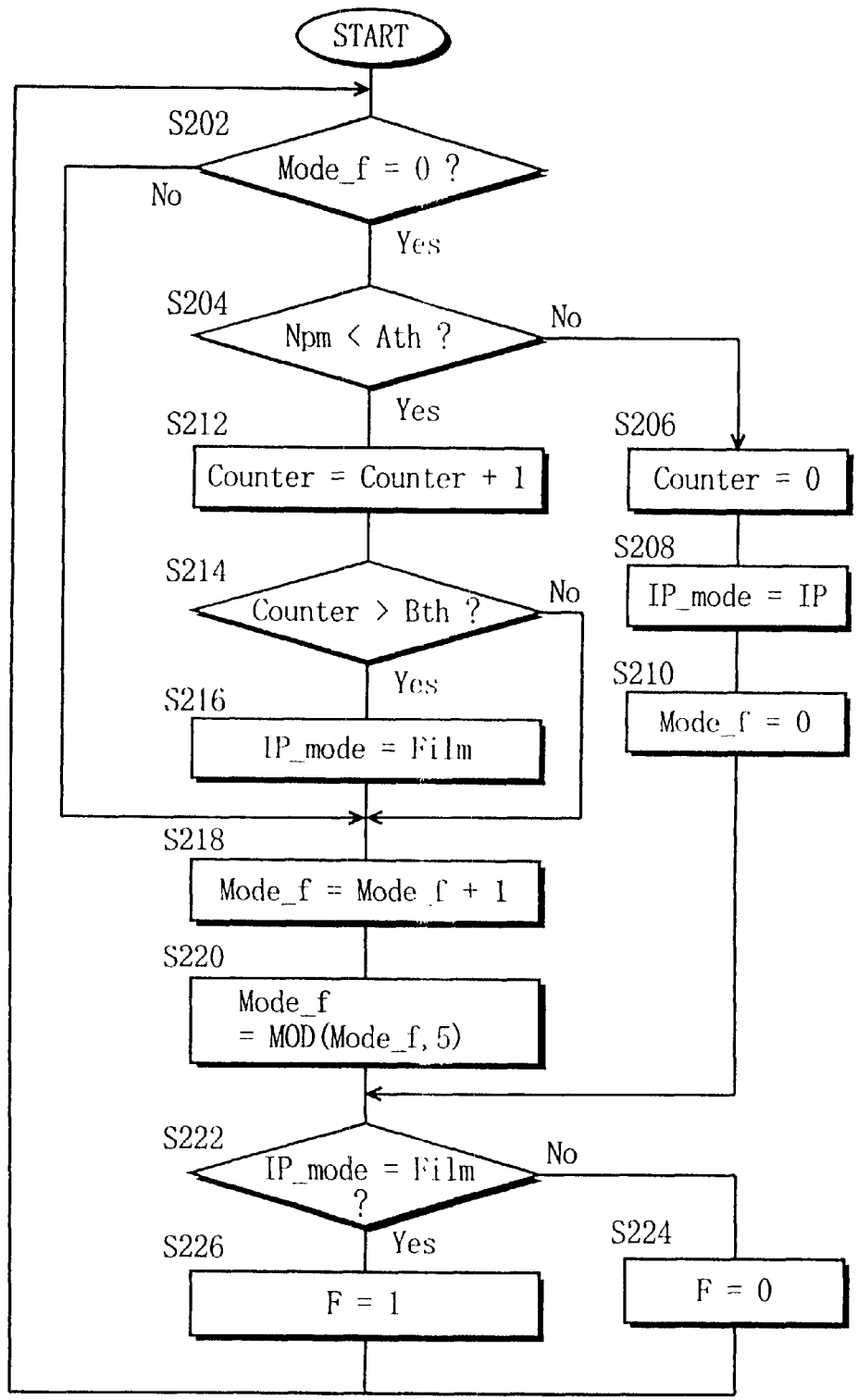
FIG. 15 is a flow chart showing the operation of the decision circuit of the telecine video signal detector shown in FIG. 13.

Next, with reference to a flow chart shown in FIG. 6, the operation of the telecine video signal detector DTp1 is described in more detail. Note that this flow chat is identical to the flow chart shown in FIG. 15 except that steps S2, S4, S6, and S8 are added thereto. In other words, these steps corresponds to the operation of the components typified by the second statistical processing unit 6, the 1-field delay unit 7, the scene-change detector 8, and the second telecine decision unit 9 shown in FIG. 1. For this reason, only these newly-added steps S2, S4, S6, and S8 are described.

First, in step S2 inserted between steps S202 and S218, whether $Mode_{13}f$ indicates 2 or 4 is determined. If No, that is, if the video signal is assumed not to represent a telecine image, the procedure goes to step S218, as that of the conventional telecine video signal detector Dtc. On the other hand, if Yes, the video signal possibly represents a telecine image, and thus the procedure goes to step S4.

In step S4, the second statistical processing unit 6 takes luminance distribution of the video signal Sv, and produces the second statistical signal Ss2. Note that, although one example of luminance distribution taken in eight levels is shown in step S4, it is needless to say that the number of levels for luminance distribution is not limited to eight but is arbitrarily determined. Then, the procedure goes to a next step S6.

In step S6, the scene-change detector 8 takes a difference between the second statistical signal Ss2 and the delayed second statistical signal Ss2d. The procedure then goes to a next step S8.

In step S8, the scene-change detector 8 determines whether the difference Syx obtained in step S6 is smaller than the threshold Cx. If Yes, it is determined that the second and fourth field data have a high correlation in the telecine video unit Tu of five fields, and signal processing for the telecine video Vt continues. The procedure then goes to step S218, wherein the value of Mode_f is incremented by 1 to 1 or 5, and then the processing for the telecine image is carried out.

On the other hand, if No in step S8, there cannot be seen the rules for a signal subjected to the 1-frame delay unit 2-the motion detector 3 pulldown scheme in which first and second and third and fourth field data have a high correlation in the telecine video unit Tu of five fields. Therefore, it is determined that the signal does not represent telecine video. Then, the procedure goes to step S206, wherein a telecine video unit count Counter is set to 0.

Figure 7:
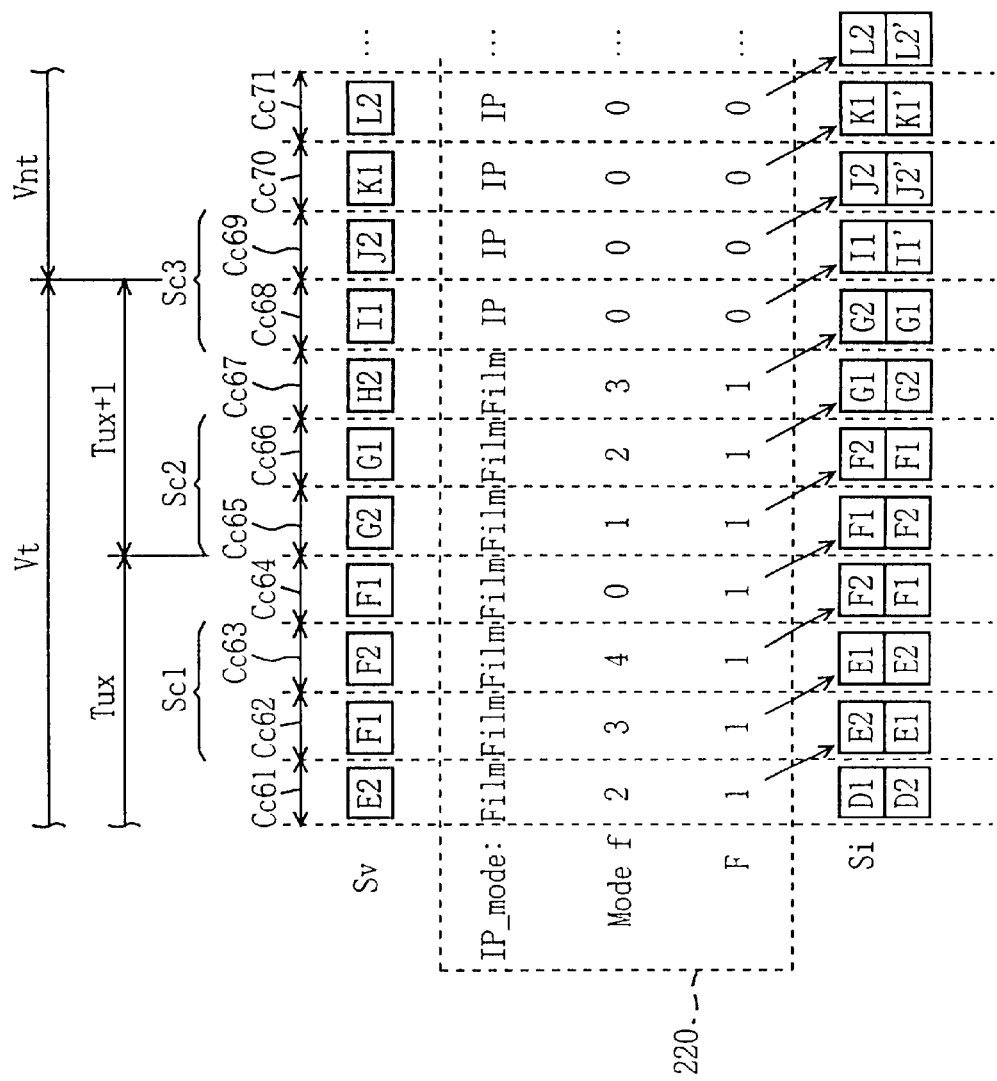
FIG. 7 is a diagram in assistance of explaining the operation of the telecine video signal detector shown in FIG.1.
Figure 17:
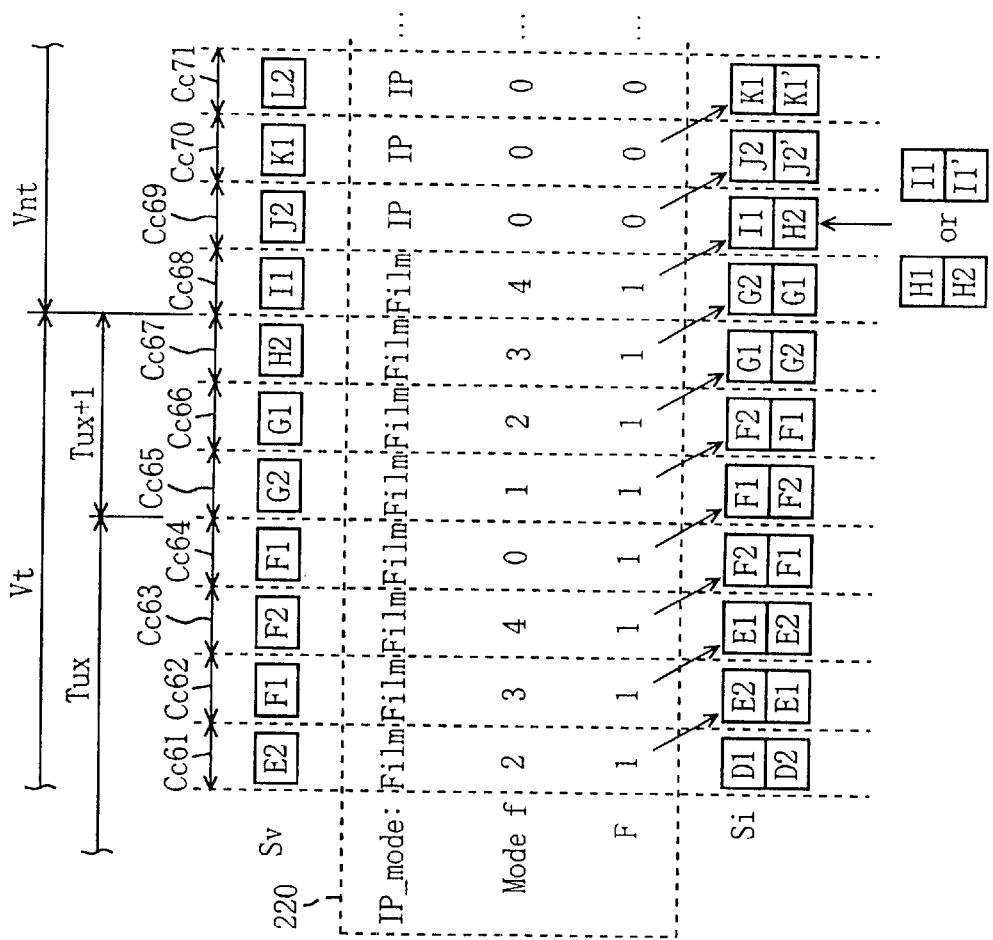
FIG. 17 is a diagram in assistance of explaining a problem during the operation of the decision circuit of the telecine video signal detector shown in FIG. 13.

Next, with reference to FIG. 7, the operation of the telecine video signal detector Dtp1 for every control cycle is descried in detail based on the flow chart shown in FIG. 6. Note that, in FIG. 7, as shown in FIG. 17 referred to for describing the problem in the conventional telecine video signal detector Dtc, the video signal Sv is provided in order of E2, F1, F2, F1, G2, G1, H2, I1, J2, K1, and L2 for every field period.

In this case, the video signal Sv represents the non-telecine video Vnt during control cycles Cc61 through Cc67, and the telecine video Vt during control cycles Cc68 through Cc71. That is, in the control cycle Cc68, instead of same-source field data H1 for the previous field data H2, field data I1 of a different image is provided. Note that, in the drawing, Sc1, Sc2, and Sc3 each indicate a scene-change in the video signal Sv.

Also in the present example, control cycles Cc60 through Cc64 forms a complete telecine video unit Tux. Therefore, the condition "if it is decided twice in successive two telecine video units Tu that the present field data is identical to field data two fields before (two control cycles before), the video signal Sv represents telecine video" is satisfied. Therefore, it is assumed that a telecine video unit Tux+1 that follows the telecine video unit Tux starts in the control cycle Cc65. And, in the successive control cycles Cc65, Cc66, and Cc67, as in the above-described control cycles Cc16 through Cc18, IP_mode=Film, Mode_f=1, 2, and 3, respectively are outputted together with the output flag F=1.

On the other hand, in the control cycle Cc68, it has been detected, with the above-described second telecine decision unit 9 and its output, that is, the second telecine decision signal St2, that the field data H2 of the telecine video Vt in the control cycle Cc67 has been switched to the field data I1 of the non-telecine video Vnt. Therefore, after steps S202, S2, S4, S6, S8, and then S206, IP_mode=IP is outputted in step S208. Further, in step S210, Mode_f=0 is outputted. The procedure goes to step S222, and then step S224, wherein the output flag F=0 is outputted.

Then, since the output flag F=0, the video signal Si is correctly formed of the field data I1 and its delayed field data I1, unlike the video signal Si being formed of the image field data I1 which is different from the telecine field data H2 as in the conventional telecine video signal detector Dtc.

Note that, in the control cycle Cc70 and Cc71, as in the above-described control cycles Cc21 and Cc22, IP_mode= IP, Mode_f =0, and the output flag F=0 are outputted, and the video signal Si is correctly formed.

As described above, the present embodiment is characterized in that, in a telecine video signal obtained through conversion into an interlaced signal by a 2–3 pulldown scheme, video subjected to successive telecine conversion is determined by utilizing the motion detector for detecting whether an image is moved between video signals at least one or more fields apart from each other; the first statistical processing unit for accumulating the results of the motion detector for one field; the first telecine decision unit for deciding, based on the result of the first statistical processing unit, whether the field represents a telecine-converted image; the second statistical processing unit for carrying out a histogram operation on an input signal for one field to detect statistical information on the video; the 1-field delay unit for delaying an output from the second statistical processing unit by at least one field; the scene-change detector for detecting, by using a predetermined threshold, a scene-change in an output signal from said 1-field delay unit and an output from the second statistical processing unit; the second telecine decision unit for deciding, based on the results of the scene-change detector and said first telecine decision unit, whether the field represents an image produced through successive telecine conversion; and the AND circuit for ANDing outputs from said two telecine decision units. As a result, if part of the telecine signal is missing due to editing or the like, the part can be detected, and whether the signal has been successively telecine-converted can be determined.

(Second Embodiment)

Figure 8:
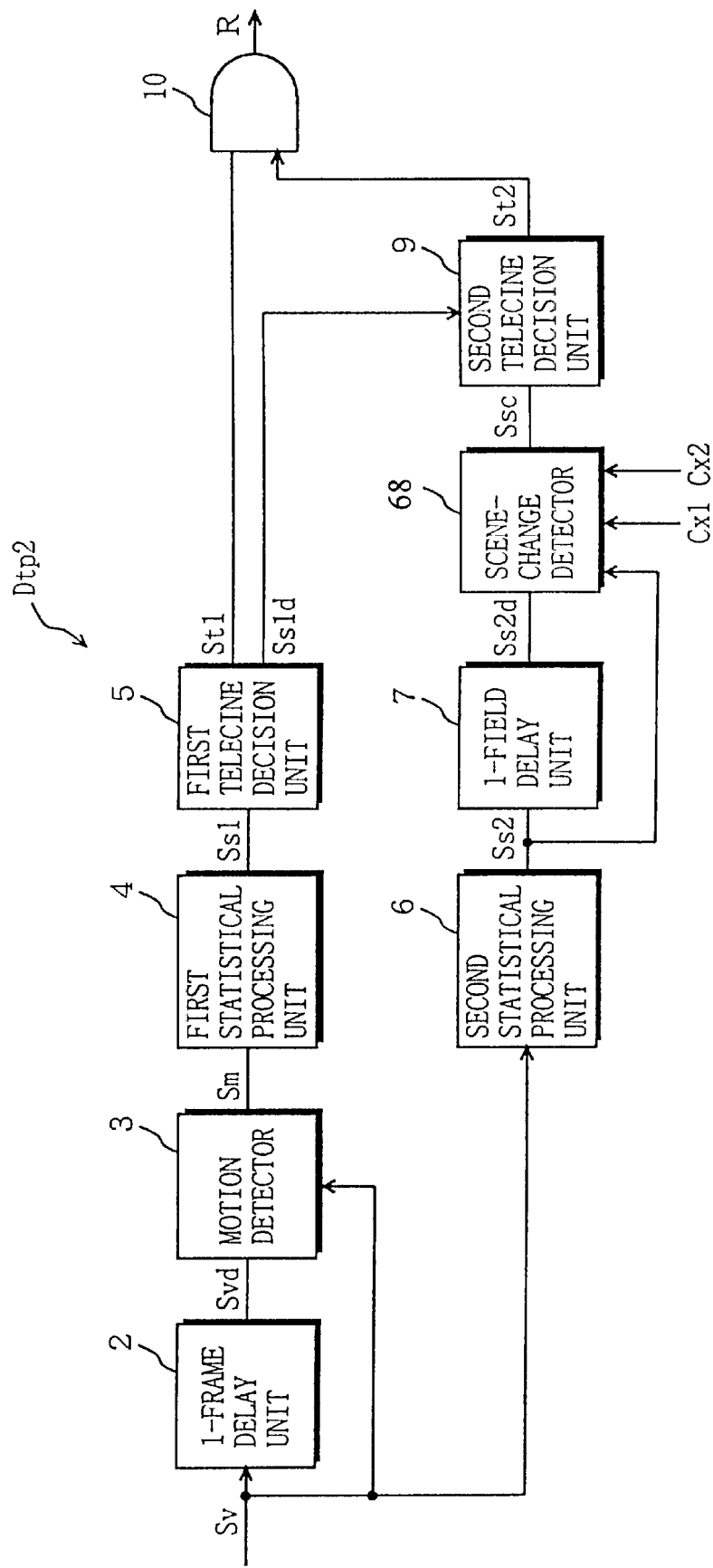
FIG. 8 is a block diagram showing a telecine video signal detector according to a second embodiment of the present invention.

Described below is a telecine video signal detector according to a second embodiment of the present invention with reference to FIGS. 8 and 9. As shown in FIG. 8, the telecine video signal detector Dtp2 according to this embodiment is identical in structure to the telecine video signal detector Dtp1 except that the scene-change detector 8 of the telecine video signal detector Dtp1 is replaced with a scene-change detector 68. Therefore, only the scene-change detector 68 is described.

The scene-change detector 8 receives an input of one threshold Cx, while the scene-change detector 68 is structured so as to receive a plurality of thresholds Cx1, Cx2, ..., Cxn (n is an arbitrary integer). Note that, for simplification, shown in FIG. 8 is one example in which two thresholds Cx1 and Cx2 are provided.

In FIG. 8, for either of cases where the output from the second statistical processing unit 6 (the second statistical signal Ss2) and the output from the 1-field delay unit 7 (the delayed second statistical signal Ss2d) are video constructed from the same frame (such as A1, A2) or not (such as A2, B1), a scene change is adaptively detected by using each predetermined threshold. Thus, a scene-change can be detected with more accuracy compared with a case where only a single threshold is used for scene-change detection.

Figure 9:
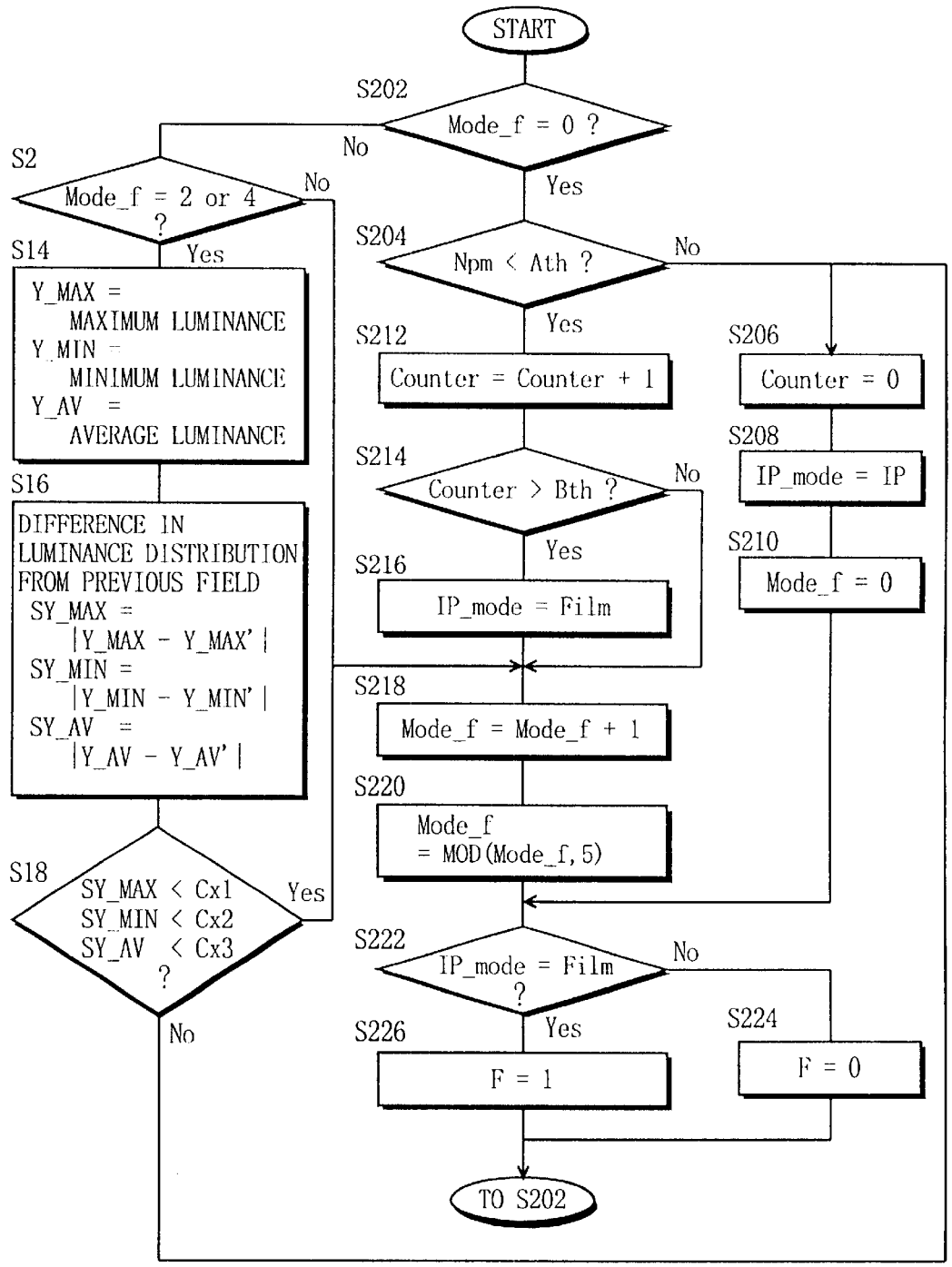
FIG. 9 is a flow chart showing the operation of the telecine video signal detector shown in FIG. 8.

With reference to a flow chat shown in FIG. 9, the operation of the telecine video signal detector Dtp2 is described. This flow chart is identical in structure to the already-described flow chart shown in FIG. 6 except that steps S4, S6, and S8 in the flow chart of FIG. 6 are replaced with steps S14, S16, and S18, respectively. Therefore, only these new steps S14, S16, and S18 are described.

Processes in steps S14, S16, and S18 are executed only when Yes in step S2.

In step S14, maximum luminance, minimum luminance, and average luminance are calculated. In step S16, based on the maximum luminance, minimum luminance, and average luminance, the difference in luminance distribution from the previous field is calculated.

In step S18, it is determined whether a maximum difference value SY_MAX, a minimum difference value SY_MIN, and an average difference value SY_AV calculated in step S16 are smaller than thresholds Cx1, Cx2, Cx3, respectively, differed from each other. If Yes, the video signal Sv is assumed to represent the telecine video Vt, and the procedure goes to step S218. On the other hand, if No, the video signal Sv is assumed to represent the non-telecine video Vnt, and the procedure goes to step S206.

As described above, the present embodiment is further characterized in that the scene-change detector adaptively carries out scene-change detection with the output from the second statistical processing unit and the output signal from second said 1-field delay unit by using the plurality of thresholds.

(Third Embodiment)

Figure 10:
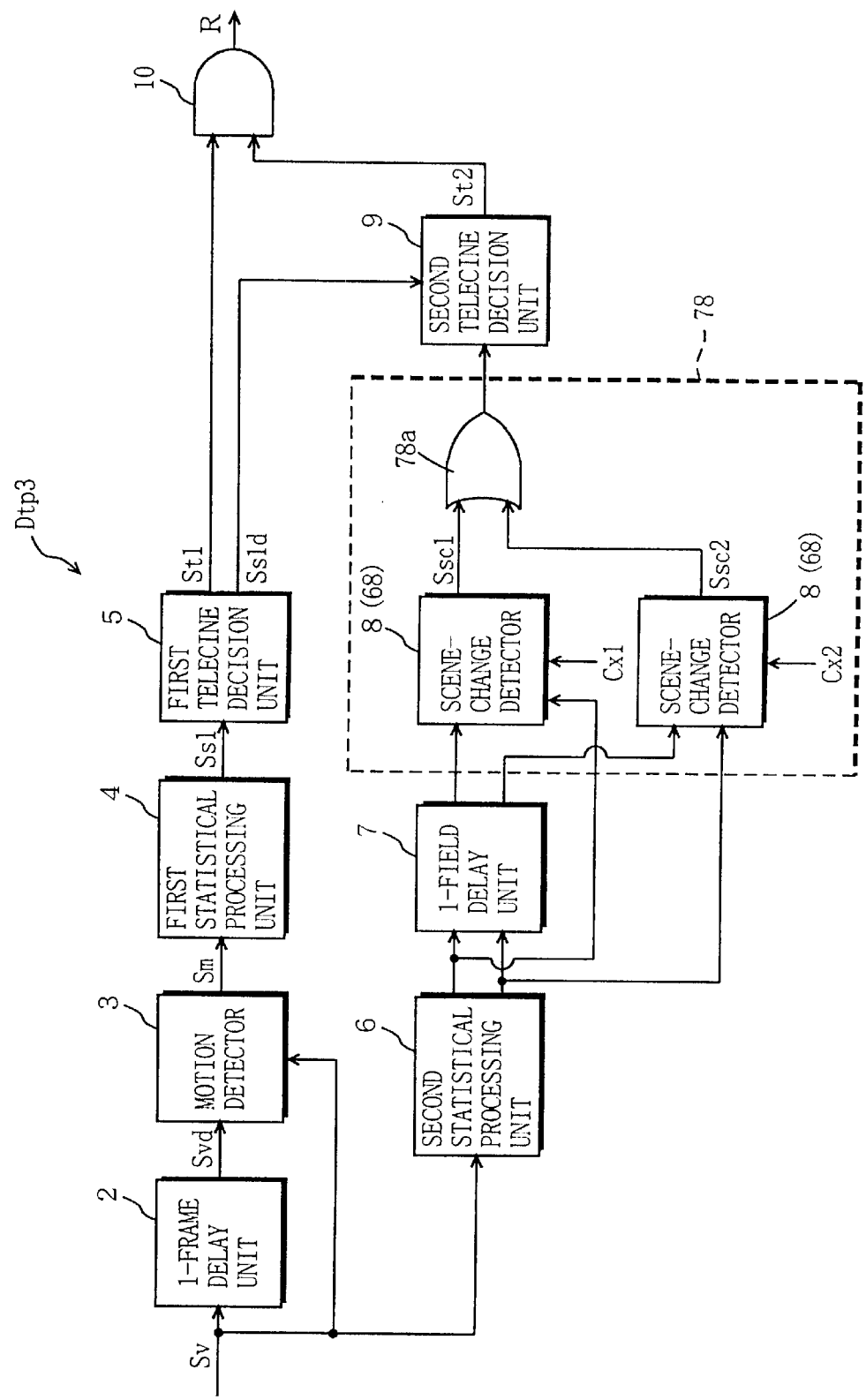
FIG. 10 is a block diagram showing a telecine video signal detector according to a third embodiment of the present invention.

With reference to FIG. 10, a telecine video signal detector according to a third embodiment of the present invention is described below. The telecine video signal detector Dtp3 according to the present embodiment is identical in structure to the telecine video detector Dtp2 except that the scene-change detector 68 in the telecine video signal detector Dtp2 shown in FIG. 8 is replaced with a scene-change detector 78. Therefore, the scene-change detector 78 is now described.

In FIG. 10, the scene-change detector 78 is structured of a plurality of scene-change detectors 8 or a plurality of scene-change detectors 68, and an OR circuit 78a for ORing output signals from these scene-change detectors. Signals provided to these scene-change detectors 8 (68) are from the second statistical processing unit 6. By using an average value, maximum value, accumulation value, or the like, of luminance signals for one field, a scene-change is detected with the signal delayed by one field.

Thus, scene-change detection can be carried out even without a histogram by using the average value or the like. Further, scene-change detection can be carried out more accurately by ORing the outputs, compared with detection by using only the average value.

As stated above, the telecine video signal detector according to the present embodiment is characterized in that a scene-change detection is carried out by further producing a plurality of outputs from the second statistical processing unit, providing these outputs to the plurality of scene-change detectors, and ORing outputs from the scene-change detectors.

(Fourth Embodiment)

Figure 11:
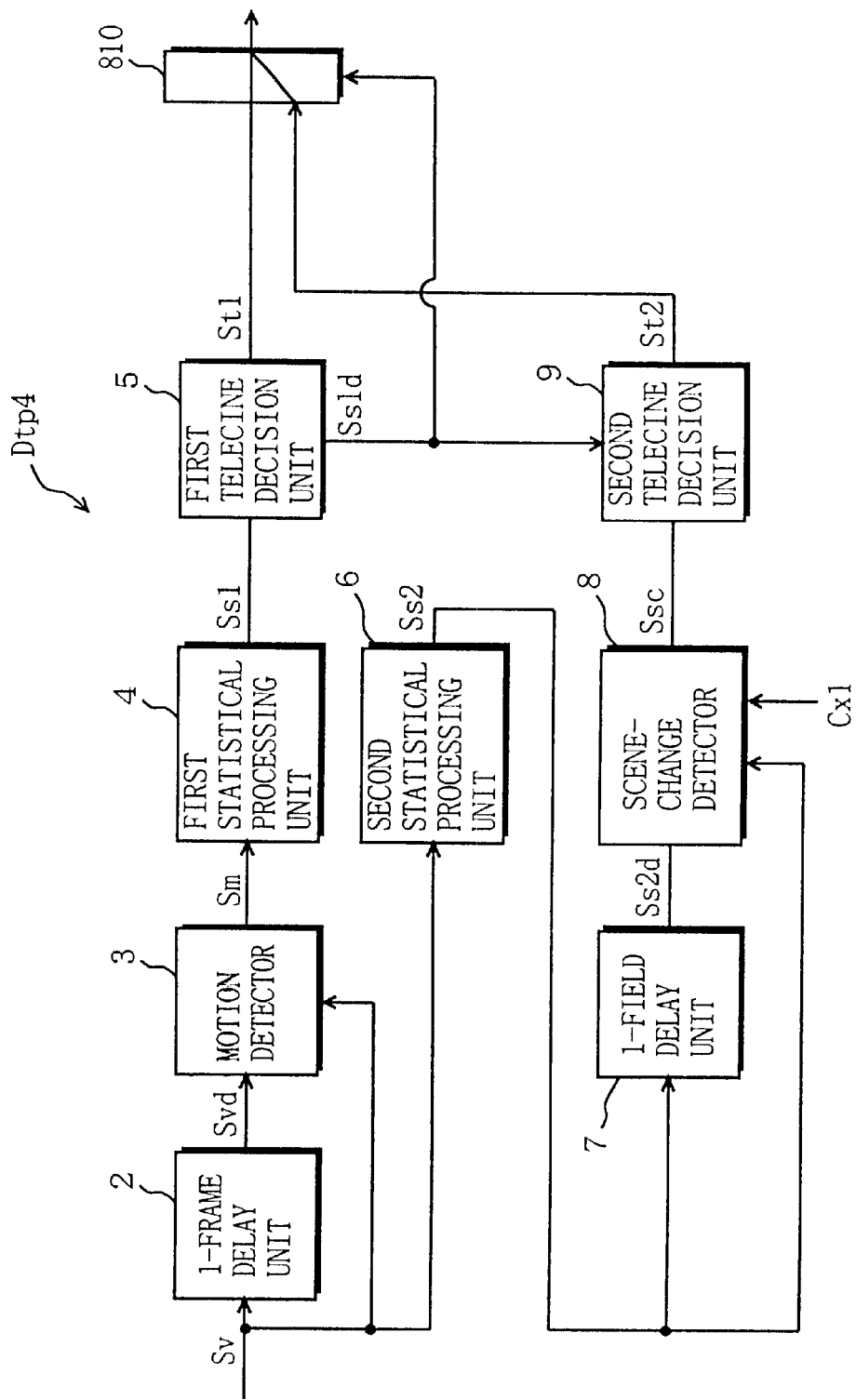
FIG. 11 is a block diagram showing a telecine video signal detector according to a fourth embodiment of the present invention.

With reference to FIG. 11, a telecine video signal detector according to a fourth embodiment of the present invention is described below. The telecine video signal detector Dtp4 according to the present embodiment is identical in structure to the telecine video detector Dtp1 except that the AND circuit in the telecine video signal detector Dtp1 shown in FIG. 1 is replaced with a selector 810. Therefore, only the selector 810 is now described.

The selector 810 switches, in timing of the timing signal Ss1d outputted from the first telecine decision unit 5, between the first telecine decision signal St1 outputted from the first telecine decision unit 5 and the second telecine decision signal St2 outputted from the second telecine decision unit 9. The first telecine decision unit 5 loads data when the timing signal Ss1d indicates 1, and holds it when 0. The second telecine decision unit 9 is reset when an output of the timing signal Ss1d indicates 0, and carries out an operation for scene-change detection when otherwise.

Thus, when the timing signal Ss1d indicates 1, the first telecine decision signal St1 outputted from the first telecine decision unit 5 is selected. Then, when the timing signal Ss1d indicates 0, the second telecine decision signal St2 outputted from the second telecine decision unit 9 is selected, and thus the operation by the AND circuit 14 and the latch 15 in the first telecine decision unit 5 is not performed when the timing signal Ss1d indicates 0. When the timing signal Ss1d indicates 1, the scene change detector 8 and the second telecine decision unit 9 are made not to carry out an operation, and thus the number of instructions can be reduced.

The telecine video signal detector according to the present embodiment is characterized in that a switch circuit is provided for switching outputs from two decision circuits with an output from the first telecine decision unit, and thus video produced through successive telecine conversion can be determined.

(Fifth Embodiment)

Figure 12:
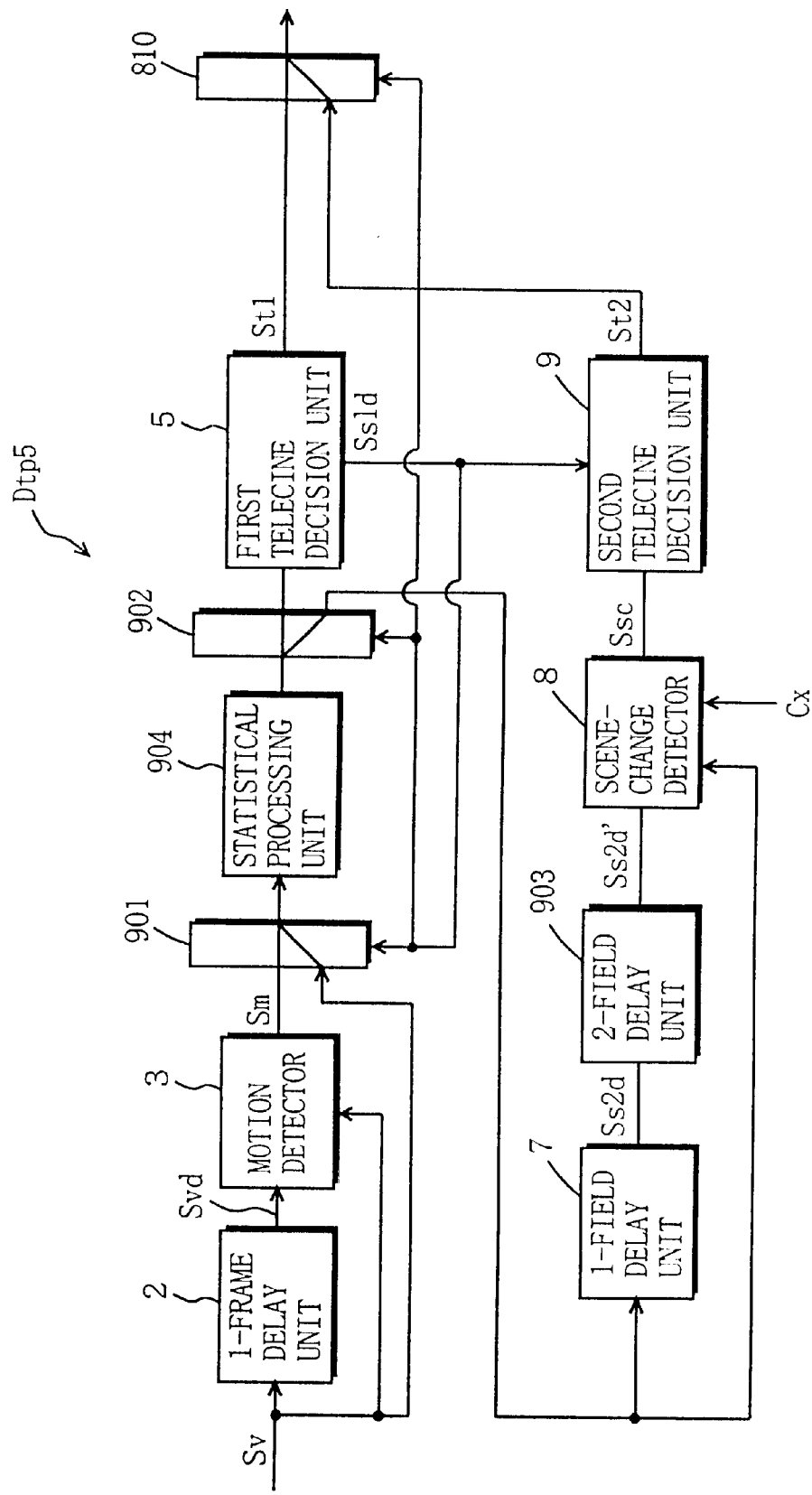
FIG. 12 is a block diagram showing the structure of a telecine video signal detector according to a fifth embodiment of the present invention.

With reference to FIG. 12, a telecine video signal detector according to a fifth embodiment of the present invention is described below. The telecine video signal detector Dtp5 according to the present embodiment is identical in structure to the telecine video detector Dtp4 except that a 2-field delay unit 903 is newly provided between the 1-field delay unit 7 and the scene-change detector 8 in the telecine video signal detector Dtp4 shown in FIG. 11, and further the first statistical processing unit 4 is replaced with a third statistical processing unit 904 with selectors 901 and 902 provided at each side thereof. Therefore, only the different points are now described.

The selector 901 switches, in timing of the timing signal Ss1d provided by the first telecine decision unit 5, between the motion detection signal Sm outputted from the motion detector 3 and the video signal Sv. The third statistical processing unit 904 carries out a statistical process for one field with respect to a signal provided by the selector 901. The selector 902 selects the first telecine decision unit 5 or the 1-field delay unit 7 and the scene-change detector 8, as a destination to which a signal from the third statistical processing unit 904 is transmitted with the timing signal Ss1d.

The 2-field delay unit 903 further delays the delayed second statistical signal Ss3d outputted from the 1-field delay unit 7 by two fields to produce a delayed third statistical signal Ss2d". The selector 901 selects the motion detection signal Sm outputted from the motion detector 3 when the timing signal Ss1d from the first telecine decision unit 5 indicates 1, and selects the video signal Sv when the timing signal Ss1d indicates 0.

The third statistical processing unit 904 carries out a statistical process, such as accumulation, histogram operation, and average value calculation, on an input from the selector 901 for one field.

The selector 902 transmits the output signal from the third statistical processing unit 904 to the first telecine decision unit 5 when the timing signal Ss1d indicates 1, and to the 1-field delay unit 7 and the scene-change detector 8 when the timing signal Ss1d indicates 0.

At this time, the processing of the second statistical processing unit 6 are carried out during a period of the field data C2, E1, E2, and F1 shown in FIG. 4. when the field data C2 is provided, the signal of the field data B1 one field before has been processed by the statistical processing circuit 4. In this case, scene-change detection is carried out by using the signal of the field data B1 further two fields after. Thus, the statistical processing circuit for carrying out a statistical process on the output signal from the motion detector and the statistical processing circuit for carrying out a statistical process on the input signal can be unified in common, and thus the circuit size can be greatly reduced.

The telecine video signal detector according to the present embodiment is characterized in that, a switch circuit is provided for switching, by using a result of the first telecine decision unit, an input signal of the statistical processing unit between a result of the motion detector and the input signal; the statistical processing is carried out by the switch circuit switching the input to the statistical processing unit and thus only a single statistical processing unit produces a result of accumulating the results of the motion detectors for one field a result of the statistical process on the input signal for one field; and a switch circuit is provided for switching, based on an output from the scene-schange detection circuit, a destination of the result of the statistical processing circuit between the decision circuit or the scene-change detector.

As described above, according to the present invention, even if a telecine signal transmitted to a receiver is in an insuccessive state due to editing or the like, whether there is a scene-change is determined for each field for deciding a boundary in editing. Thus, erroneous detection in the telecine signal can be reduced.

INDUSTRIAL APPLICABILITY

As described above, the present invention can be effectively used for a television to receive video signals distributed as a mixture of interlaced telecine video signals and non-telecine video signals, to correctly construct frame video, and to display the video.

What is claimed is:

1. In a telecine video signal obtained through conversion into an interlaced signal by a 2–3 pulldown scheme, a telecine video signal detector for detecting, if part of the telecine signal is missing, the missing part of the telecine signal and deciding whether successive telecine conversion has been carried out, the detector comprising:

motion detection means for detecting a motion of an image between a first field of said telecine video signal and a second field at least one or more fields apart from the first field, and generating a motion detection signal;

first statistical processing means for accumulating said motion detection signals for one field, and generating a first statistical signal;

first telecine decision means for deciding, based on said first statistical signal, whether said first field represents a telecine-converted image, and generating a first telecine decision signal;

second statistical processing means for carrying out a histogram operation with respect to said telecine video signal for one field, and generating a second telecine decision signal including video statistical information;

1-field delay means for delaying said second statistical signal by at least one field, and generating a delayed second statistical signal;

scene-change detection means for detecting, based on said second statistical signal, said delayed second statistical signal, and a predetermined threshold, a scene-change in said telecine video, signal and generating a scene-change detection signal;

second telecine decision means for deciding, based on said scene-change detection signal and the first telecine decision signal, whether said first field represents an image produced through successive telecine conversion, and generating a second telecine decision signal; and AND operation means for carrying out an AND operation on said first telecine decision signal and the second telecine decision signal, wherein whether said first field represents the image produced through successive telecine conversion is indicated based on a result of the AND operation.

2. The telecine video signal detector as claimed in claim 1, wherein said predetermined threshold is two or more, and said scene-change detection means adaptively detects the scene-change.

3. The telecine video signal detector as claimed in claim 1, herein said second statistical processing means outputs a plurality of second statistical signals, said scene-change detection means comprises:
a plurality of scene-change detection circuits for generating a plurality of scene-change detection signals corresponding to said plurality of second statistical signals; and
OR operation means provided with said plurality of scene-change detection signals for carrying out an OR operation, and
the scene-change of said video signal is detected with a result of the OR operation on said plurality of scene-change detection signals.

4. The telecine video signal detector as claimed in claim 1, wherein said first decision means comprises 5-field delay means for delaying said first statistical signal by five fields, and generates a timing signal, and the detector comprises selection means for selectively outputting one of said first telecine decision signal and the second telecine decision signal based on said timing signal, and successively decides whether said video signal represents video produced through telecine conversion.

5. The telecine video signal detector as claimed in claim 4, further comprising:

2-field delay means for further delaying said delayed second statistical signal by two fields and generating a delayed third statistical signal;

first switch means for selectively inputting, based on said first telecine decision signal, one of said motion detection signal and said video signal to said first statistical processing means by a unit of field; and second switch means for outputting a result of accumulation of said motion detection signals for one field and a result of a statistical process on the input signal for one field that are carried out only by the first statistical processing means with a help of said first switch means switching an input to said first statistical processing means, and switching, based on an output from the scene-change detection means, a destination to which the first statistical signal is provided between said first telecine decision means and said scene-change detection means.

* * * * *